United States Patent [19]

Saito et al.

[11] Patent Number: 5,225,941
[45] Date of Patent: Jul. 6, 1993

[54] DRIVING DEVICE

[75] Inventors: Schuichiro Saito, Kanagawa; Masatoshi Nagano, Tokyo, both of Japan

[73] Assignee: Canon Kabushiki Kaisha, Tokyo, Japan

[21] Appl. No.: 723,911

[22] Filed: Jul. 1, 1991

[30] Foreign Application Priority Data

| Jul. 3, 1990 | [JP] | Japan | 2-175544 |
| Jul. 3, 1990 | [JP] | Japan | 2-175545 |
| Jul. 3, 1990 | [JP] | Japan | 2-175546 |
| Oct. 9, 1990 | [JP] | Japan | 2-271959 |
| Oct. 9, 1990 | [JP] | Japan | 2-271960 |
| Oct. 9, 1990 | [JP] | Japan | 2-271962 |
| Nov. 19, 1990 | [JP] | Japan | 2-313694 |
| Nov. 27, 1990 | [JP] | Japan | 2-324532 |
| Nov. 27, 1990 | [JP] | Japan | 2-324534 |

[51] Int. Cl.$^5$ ............................................. G02B 7/02
[52] U.S. Cl. ................................. 359/824; 359/823; 310/311; 310/320; 354/195.1; 354/195.11; 369/44.11; 369/44.14
[58] Field of Search ........... 359/824, 823, 822, 223, 359/224; 354/195.1, 195.11, 195.12; 310/320, 323, 327, 311; 248/636, 638; 369/44.11, 44.26, 44.14, 44.17, 44.19

[56] References Cited

U.S. PATENT DOCUMENTS

| 4,291,958 | 9/1981 | Frank et al. | 359/284 |
| 4,302,830 | 11/1981 | Hamaoka et al. | 359/824 |
| 4,303,324 | 12/1981 | Marcus | 359/824 |
| 4,423,941 | 1/1984 | Iwata et al. | 359/824 |
| 4,676,605 | 6/1987 | Toda et al. | 350/429 |
| 4,894,579 | 1/1990 | Higuchi et al. | 310/328 |
| 4,897,589 | 1/1990 | Fujiwara et al. | 318/685 |
| 4,920,369 | 4/1990 | Kaneda et al. | 354/400 |
| 5,150,260 | 9/1992 | Chigira | 359/694 |

FOREIGN PATENT DOCUMENTS 3122987 3/1982 Fed. Rep. of Germany .
60-263113 12/1985 Japan .

Primary Examiner—Paul M. Dzierzynski
Assistant Examiner—Kiet T. Nguyen
Attorney, Agent, or Firm—Fitzpatrick, Cella, Harper & Scinto

[57] ABSTRACT

A driving device includes a driving member which is frictionally engaged with a driven member or a member coupled to the driven member and which is movably supported on a fixed member, a piezoelectric element disposed in contact with the driving member, and a driving circuit for applying a voltage to the piezoelectric element so as to make the speed of expansion of the piezoelectric element different from the speed of contraction thereof.

26 Claims, 22 Drawing Sheets

DRIVING DEVICE

BACKGROUND OF THE INVENTION

1. Field of the Invention

The present invention relates to a driving device for driving an object and, more particularly, to a driving device for driving a movable object incorporated in, for example, a precision machine or an imaging apparatus.

2. Description of the Related Art

A conventional example will be described below with reference to a lens driving device incorporated in a photographic apparatus, such as a video camera, which is one example of a precision machine or an imaging apparatus.

FIG. 5 is a diagrammatic exploded perspective view of a conventional zoom lens mechanism incorporated in a video camera or the like. Referring to FIG. 5, a lens barrel 1 holds a lens, and a support plate 1h and an arm 1e project horizontally in opposite directions from the external peripheral surface of the lens barrel 1. Projections 1a and 1c project from one side of the support plate 1h at the front and rear end portions thereof, and holes 1b and 1d are formed so as to extend through the respective projections 1a and 1c in a direction parallel to the lens optical axis. A guide bar 2, which is secured to a support member (not shown), is relatively slidably inserted through the holes 1b and 1d. A follower pin 1g extends vertically downwardly from the underside of the portion of the support plate 1h which is near to the projection 1a. The follower pin 1g is arranged to be relatively slidably inserted into a cam slot formed in a cam plate 4 which will be described later.

A lateral groove 1f which is U-shaped in cross section is formed in the extending end portion of the arm 1e of the lens barrel 1, and a guide bar 3 which is secured to a support member (not shown) is relatively slidably inserted through the groove 1f. Accordingly, the lens barrel 1 is supported by the guide bars 2 and 3 so that it can move in a direction parallel to the lens optical axis.

The cam plate 4, which is horizontally disposed below the lens barrel 1, has a guide slot 4a which extends in a direction perpendicular to the axes of the guide bars 2 and 3, and a cam slot 4b which extends obliquely with respect to the axis of the slot 4a. Two guide pins 25 and 26 which project from a fixed member (not shown) are relatively slidably inserted into the guide slot 4a, and the cam plate 4 is supported on a fixed member (not shown) for movement in parallel with the slot 4a.

Rack teeth 4c are formed along a rear end portion of the cam plate 4, and a gear 5 is meshed with the rack teeth 4c. The gear 5 is meshed with a small-diameter gear of a stepped gear 6, and a large-diameter gear of the stepped gear 6 is meshed with a pinion gear 7 secured to a shaft 8a of a motor 8.

A slidable contact piece 9 is secured to the underside of the cam plate 4 with an electrically insulating sheet 11 interposed therebetween, and the slidable contact piece 9 has two arms 9a and 9b. Bent portions 9d and 9e are formed at the extending ends of the respective arms 9a and 9b, and the bent portions 9d and 9e are respectively in contact with a conductor part 1a and a resistor part 10b formed on a fixed detecting plate 10.

The fixed detecting plate 10 has a construction in which the conductor part 10a and the resistor part 10b are formed on an electrically insulating board 10c. The conductor part 10a is connected to a power source by a lead wire 10f. Two lead wires 10d and 10e which lead from the resistor part 10b are connected via output terminals to input terminals of a microcomputer which will be described later. In a position detecting assembly consisting of the slidable contact piece 9 and the fixed detecting plate 10, its output varies depending on what portion of the resistor part 10b is in contact with the bent portion 9e of the arm 9b of the slidable contact piece 9. In other words, a voltage applied to the conductor part 10a through the lead wire 10f is divided according to the position of the bent portion 9e which is in contact with the resistor part 10b, and the divided voltage outputs are developed on the lead wires 10d and 10e.

The operation of the conventional zoom lens mechanism having the above-described structure will be described below.

When the motor 8 is activated by a control device (not shown), the pinion gear 7, the gear 6 and the gear 5 are made to rotate about their axes, and the cam plate 4 is made to move by the rack teeth 4c meshed with the gear 5 while it is being guided by the guide pins 5 and 6 in a direction perpendicular to the axes of the guide bars 2 and 3. During this time, the arms 9a and 9b of the slidable contact piece 9 slide on the conductor part 10a and the resistor part 10b, respectively. While the cam plate 4 is being made to move in parallel with the axis of the guide slot 4a, the follower pin 1g slides in the cam slot 4b, so that a force is applied to the lens barrel 1 via the follower pin 1g in a direction parallel to the lens optical axis. Accordingly, the lens barrel 1 is made to move in parallel with the lens optical axis while it is being guided by the guide bars 2 and 3. The position of the lens barrel 1 which is in progressive movement is electrically detected by the position detecting assembly consisting of the slidable contact piece 9 and the fixed detecting plate 10. If the detection result becomes equal to a predetermined set value, the motor 8 is stopped by the control device (not shown), so that the lens held in the lens barrel 1 is automatically positioned at a desired location.

However, the aforesaid conventional driving mechanism has a number of problems. For example, because it is necessary to use numerous parts such as a motor, gears and a cam mechanism, the conventional driving mechanism is excessively large in size and weight. Accordingly, it has been difficult to reduce the size and weight of an imaging apparatus provided with such a conventional driving mechanism and it has been impossible to greatly reduce manufacturing cost. In addition, since gears are used, the backlash of the gears has made it difficult to achieve highly accurate positioning of a lens and also to control the amount of movement of the lens with high accuracy.

SUMMARY OF THE INVENTION

It is, therefore, an object of the present invention to provide a driving device which utilizes a piezoelectric element as a driving-power generating source and which includes a means for applying voltage to make the speeds of expansion and contraction of the piezoelectric element differ from each other so that highly accurate positioning and reductions in size and weight can be achieved.

The above and other objects, features and advantages of the present invention will become apparent from the following detailed description of preferred embodi-

DETAILED DESCRIPTION OF THE PREFERRED EMBODIMENTS

Figure 1:
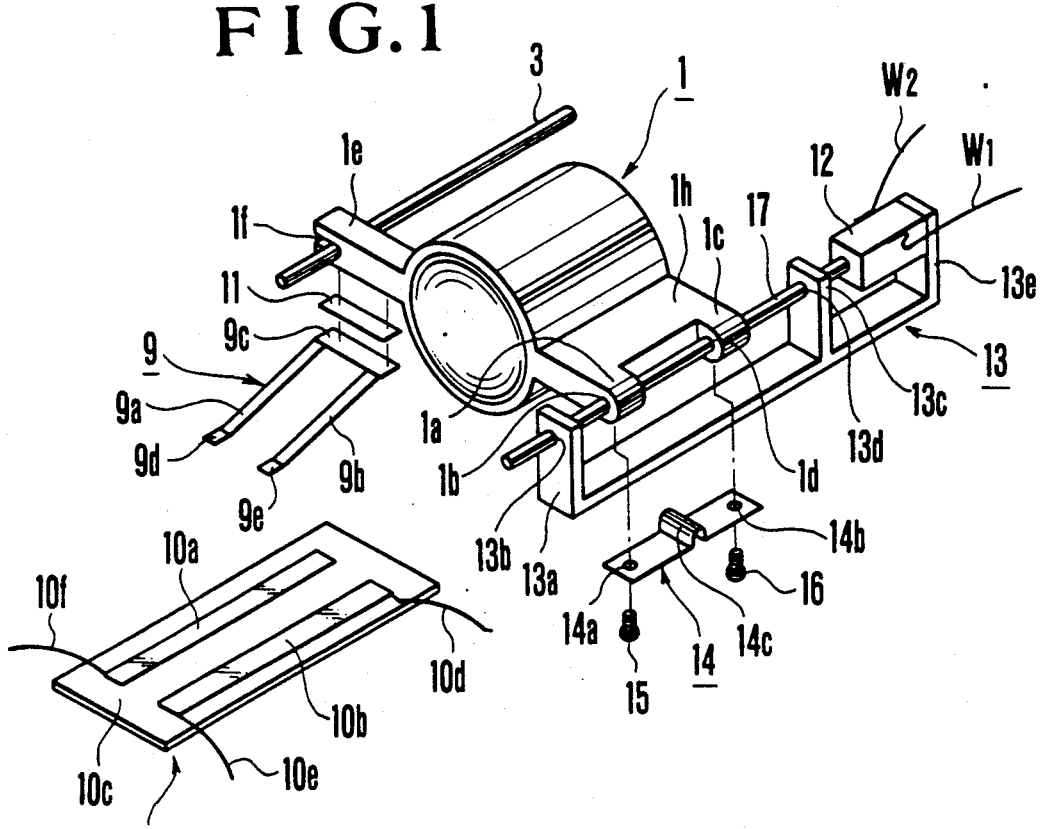
FIG. 1 is an exploded perspective view diagrammatically showing a lens-barrel driving device according to a first embodiment of the present invention.
Figure 2:
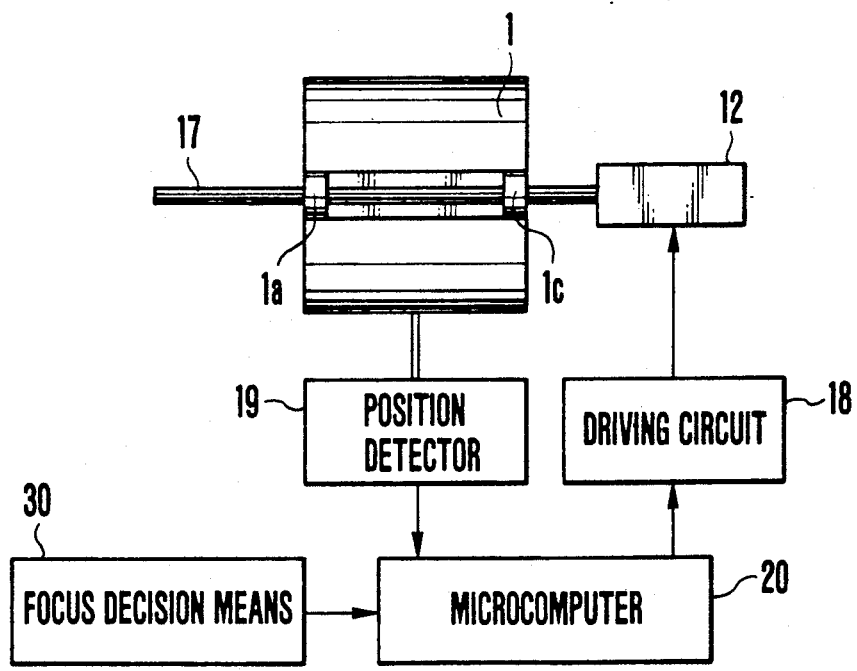
FIG. 2 is a schematic view of a control system for the driving device according to the first embodiment of the present invention.
Figure 5:
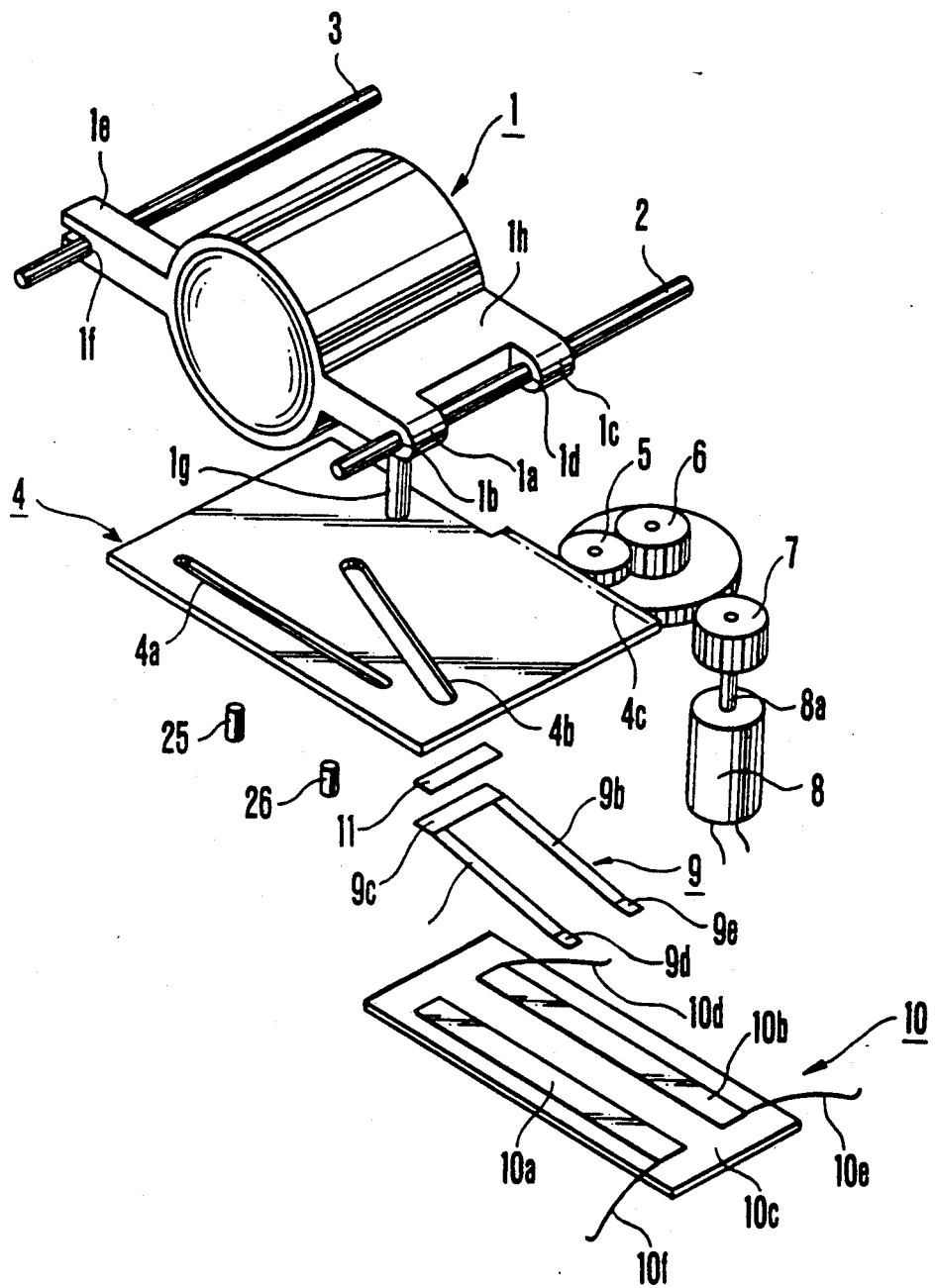
FIG. 5 is an exploded perspective view diagrammatically showing one example of a conventional zoom-lens driving device.

FIG. 1 and FIG. 2 are diagrammatic views showing a lens driving device to which a first embodiment of the present invention is applied. In FIG. 1, identical reference numerals are used to denote members which are substantially identical to those shown in FIG. 5. Referring to FIG. 1, a lens barrel is generally indicated by 1, and a guide bar 3 supports and guides the lens barrel 1 along the lens optical axis. Projections 1a and 1c project from the lens barrel 1 in a direction opposite to the guide bar 3, and a driving rod 17 which serves also as a lens-barrel supporting member (hereinafter referred to simply as the "driving rod 17") is relatively slidably inserted through holes 1b and 1d which are formed in the respective projections 1a and 1c. The driving rod 17 serves to support the lens barrel 1 and to cause the lens barrel 1 to move in the axial direction thereof. The driving rod 17 is axially movably inserted through holes 13b and 13d which are respectively formed in first and second upright portions 13a and 13c, both of which are formed on a driving-rod supporting member 13. The driving rod 17 extends through the second upright portion 13c of the driving-rod supporting member 13 in a rearward direction. The rear end of the driving rod 17 is secured to the front end of a piezoelectric element 12 which is fixed at its rear end to a third upright portion 13e of the driving-rod supporting member 13.

Vertical holes are formed in the lower portions of the respective projections 1a and 1c of the lens barrel 1. A leaf spring 14 has through-openings 14a and 14b which are respectively formed in its opposite end portions at positions corresponding to the vertical holes. The leaf spring 14 is mounted on the undersides of the respective projections 1a and 1c by screws 15 and 16 in parallel with the driving rod 17. A curved projection 14c which is upwardly raised is formed at the middle of the leaf spring 14, and the curved projection 14c is pressed in contact with the underside of the driving rod 17 at a middle position between the projections 1a and 1c. Accordingly, the driving rod 17 is forced upwardly in the holes 1b and 1d of the respective projections 1a and 1b so that upper portions of the external surface of the driving rod 17 are pressed in contact with the respective upper portions of the inner surfaces of the holes 1b and 1d by the elastic force of the leaf spring 14. Accordingly, if an axial force below a resultant force composed of the frictional force between the inner surfaces of the holes 1b and 1d and the driving rod 17 and the frictional force between the curved projection 14c and the driving rod 17 are applied to the driving rod 17, the lens barrel 1 and the driving rod 17 are made to move integrally. If an axial force above such resultant force is applied to the driving rod 17, the driving rod 17 alone can be made to move in the axial direction. In FIG. 1, reference numerals W1 and W2 denote lead wires for supplying electricity to the piezoelectric element 12.

The operation of the leaf spring 14 for bringing the driving rod 17 into frictional engagement with the lens barrel 1 will be described below.

To produce such frictional forces stably and to prevent the elastic force of the leaf spring 14 from acting in the direction of displacement of the lens barrel 1, the elastic force of the leaf spring 14 is applied to the driving rod 17 approximately perpendicularly. If the leaf spring 14 is elastically deformed in the direction of expansion or contraction of the piezoelectric element 12 as a result of the expansion or contraction thereof, the frictional force between the driving rod 17 and the lens barrel 1 will vary and, in addition, the elastic force will act in the direction of displacement of the lens barrel 1 to make the displacement of the lens barrel 1 unstable. To prevent this phenomenon, the leaf spring 14 has a flat portion parallel to the directions of expansion and contraction of the piezoelectric element 12 so that the leaf spring 14 can exhibit a large rigidity in these directions.

A U-shaped slidable contact piece 9 having a pair of arms 9a and 9b which are parallel to the axis of the lens barrel 1 is secured to the underside of the arm 1e of the lens barrel 1 in such a way that the slidable contact piece 9 is bonded to an electrically insulating sheet 11 at its connecting portion 9c and the electrically insulating sheet 11 is bonded to the underside of the arm 1e.

A fixed detecting plate 10 mounted on a fixed member (not shown) is disposed below the path of movement of the lens barrel 1. The fixed detecting plate 10 has a structure in which both a conductor part 10a for slidable contact with a bent portion 9d formed at the end portion of the arm 9a of the slidable contact piece 9 and a resistor part 10b for slidable contact with a bent portion 9e formed at the end portion of the arm 9b of the slidable contact piece 9 are formed on an electrically insulating board 10c. One end of the conductor part 10a is connected to a power source (not shown) by a lead wire 10f, while lead wires 10d and 10e connected to opposite ends of the resistor part 10b are connected to an output terminal (not shown). A voltage value indicating what portion of the resistor part 10b is in contact with the bent portion 9e of the arm 9b of the slidable contact piece 9 is provided at the output terminal. The output terminal is connected to an input port of a microcomputer which will be described later.

FIG. 2 is a diagrammatic view showing a control system for the driving device shown in FIG. 1. The control system shown in FIG. 2 includes a driving circuit 18 for applying a driving voltage to the piezoelectric element 12, a lens-barrel-position detector 19 consisting of the above-described slidable contact piece 9 and the fixed detecting plate 10, a microcomputer 20 for receiving an output from the detector 19 and controlling the driving circuit 18, and focus decision means 30 for determining whether in-focus has been achieved.

Figure 6:
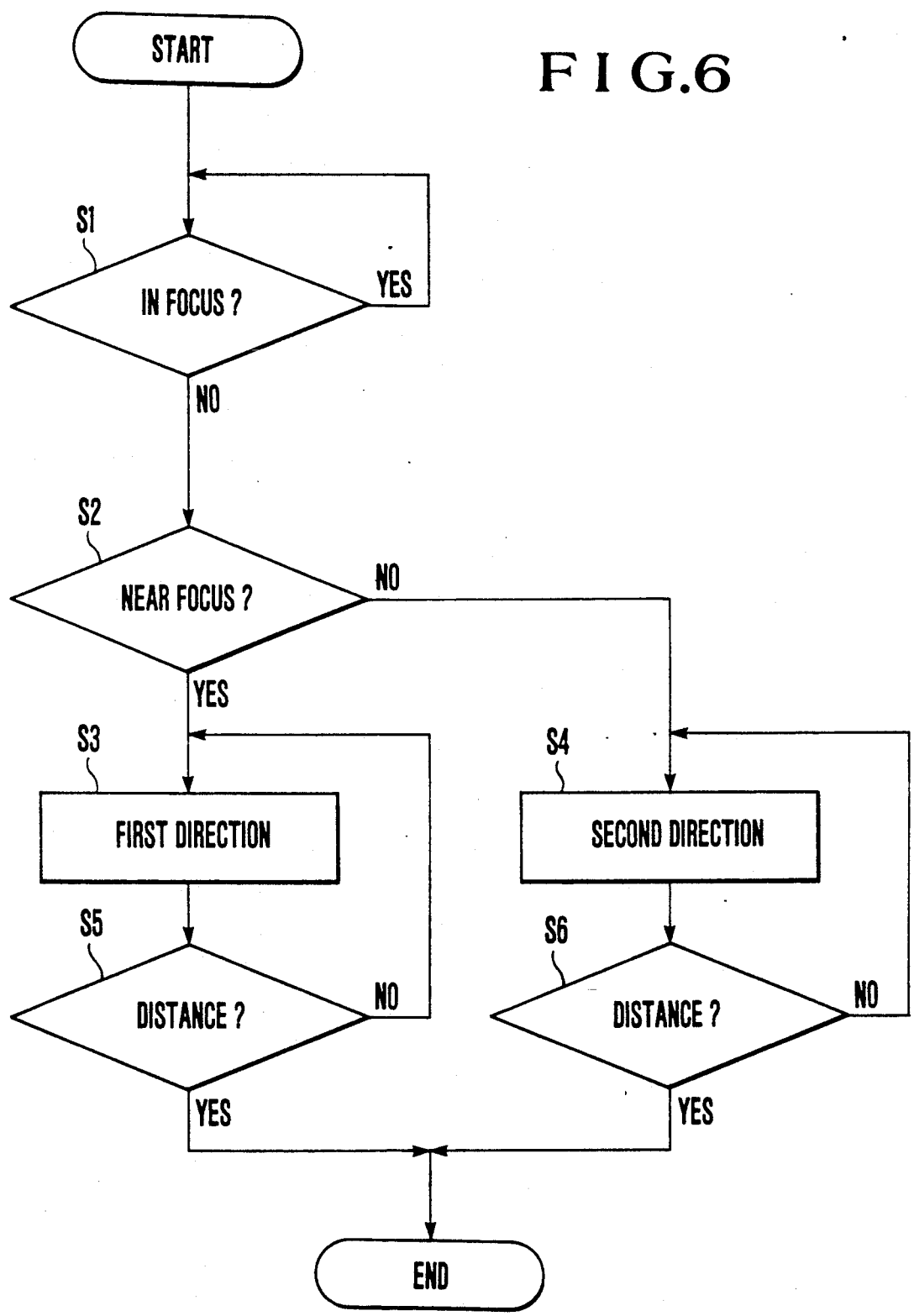
FIG. 6 is a flowchart for explaining the operation of the control system shown in FIG. 2.

FIG. 6 is a flowchart showing the operation of the above-described control system.

In Step S1, the focus decision means 30 determines whether in-focus has been achieved. If in-focus has not yet been achieved, the process proceeds to Step S2, where it is determined in which direction and by what amount the lens should be made to move to achieve in-focus.

In Step S2, if it is determined that the state of focus is "near focus", the process proceeds to Step S3, while if it is determined that it is "far focus", the process proceeds to Step S4.

In Step S3, the lens is driven to move in a first direction in which in-focus can be achieved in the case of the near focus, and the process proceeds to Step S5. In Step S4, the lens is driven to move in a second direction which in-focus can be achieved in the case of the far focus, and the process proceeds to Step S6.

In Step S5 or S6, the microcomputer 20 detects whether the lens has moved by the amount of movement required to reach the in-focus position obtained in Step S2. The lens is made to move until in-focus is achieved, and if the in-focus is achieved, the process is brought to an end.

In the above-described driving method, the relation between driving pulses and the amount of movement may not show coincidence due to vibrations, attitude difference or the like. For this reason, it is very effective to actually detect the state of movement by the lens-barrel-position detector 19 and carry out driving by feedback (a closed loop) of the detection result.

Figure 3A:
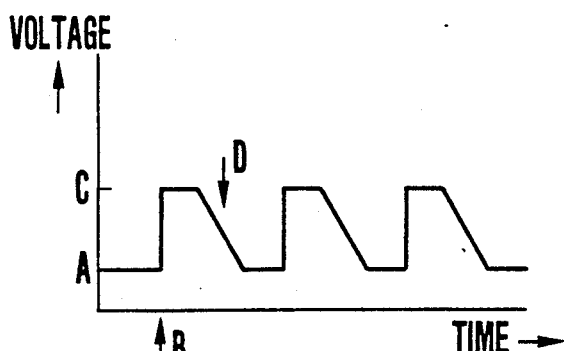
FIGS. 3(A) and 3(B) are diagrams showing the waveforms of driving pulses applied to a piezoelectric element in the first embodiment of the present invention.
Figure 3B:
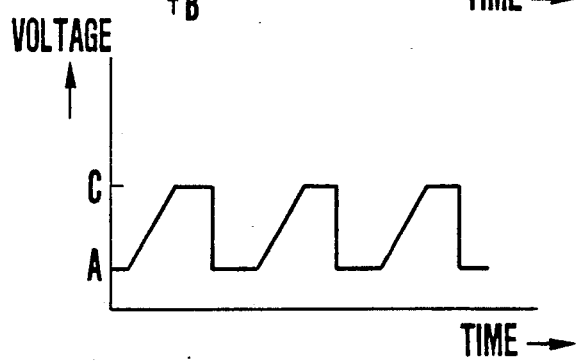

FIGS. 3(A) and 3(B) are graphs showing different waveforms of a voltage applied to the piezoelectric element 12 by the driving circuit 18. FIG. 3(A) shows the waveform of a voltage which is applied to the piezoelectric element 12 in order to move the lens barrel 1 in a rightward direction as viewed in FIG. 1. FIG. 3(B) shows the waveform of a voltage which is applied to the piezoelectric element 12 in order to move the lens barrel 1 in a leftward direction as viewed in FIG. 1.

When a driving pulse such as that shown in FIG. 3(A) is applied to the piezoelectric element 12, the piezoelectric element 12 rapidly expands at a vertical rising edge B of the driving pulse at which this pulse changes from a voltage A to a voltage C. At this time, the driving rod 17 is made to move in the leftward direction as viewed in FIG. 1 by an amount equivalent to the amount of expansion of the piezoelectric element 12. In this case, the lens barrel 1 does not move because the sum of the inertia of the lens barrel 1, the friction between the guide bar 3 and the inner surface of the U-shaped groove 1f and the like of the lens barrel 1 is greater than the driving force obtainable from the piezoelectric element 12.

At a falling edge D of the driving pulse during which this pulse slowly changes from the voltage C to the voltage A, the piezoelectric element 12 slowly contracts and the lens barrel 1 is made to move in the rightward direction as viewed in FIG. 1 by the frictional force between the lens barrel 1 and the driving rod 17 and by the frictional force between the leaf spring 14 and the driving rod 17. At the time when the contraction of the piezoelectric element 12 is completed, the rightward movement of the driving rod 17 as viewed in FIG. 1 comes to a stop. However, the lens barrel 1 continues to move in the rightward direction as viewed in FIG. 1 by the kinetic energy of the lens barrel 1. When the kinetic energy is consumed, the lens barrel 1 comes to a stop by the friction between the lens barrel 1 and the driving rod 17, the friction between the leaf spring 14 and the driving rod 17, and the like.

The above-described motion is repeated by the application of each driving pulse so that the lens barrel 1 is driven to move in the rightward direction as viewed in FIG. 1. The position of the lens barrel 1 which is in progressive movement is detected sequentially in time by the position detector 19 consisting of the slidable contact piece 9 and the fixed detecting plate 10, and the output of the position detector 19 is fed back to the microcomputer 20. When the input signal from the position detector 19 becomes equal to a predetermined set value, the microcomputer 20 causes the driving circuit 18 to stop driving the piezoelectric element 12.

When the lens barrel 1 is to be moved in the leftward direction as viewed in FIG. 1, the microcomputer 20 controls the driving circuit 18 to apply a driving pulse such as that shown in FIG. 3(B) to the piezoelectric element 12. In this case, the driving pulse applied to the piezoelectric element 12 has a gradual rising edge and a vertical falling edge as shown in FIG. 3(B), so that the operation of the piezoelectric element 12 and that of the lens barrel 1 are reversed. More specifically, at the rising edge of the driving pulse at which this pulse slowly changes from the voltage A to the voltage C, the piezoelectric element 12 slowly expands and, therefore, the lens barrel 1 is made to move integrally with the driving rod 17 in the leftward direction as viewed in FIG. 1 by the friction between the driving rod 17 and the inner surfaces of the respective holes 1b and 1d of the lens barrel 1 and by the friction between the driving rod 17 and the curved projection 14c of the leaf spring 14. When the expansion of the piezoelectric element 12 is completed (the voltage C is reached), the motion of the driving rod 17 comes to a stop, but the lens barrel 1 continues to move by inertia. When the total amount of consumed energy such as the friction among the lens barrel 1, the driving rod 17 and the guide bar 3, the friction between the leaf spring 14 and the driving rod 17 and the like becomes equal to the kinetic energy of the lens barrel 1 and the like (when the kinetic energy of the lens barrel 1 and the like is consumed by the aforesaid frictions), the lens barrel 1 comes to a stop.

Then, the piezoelectric element 12 rapidly contracts at the falling edge of the driving pulse at which this pulse rapidly changes from the voltage C to the voltage A. Accordingly, the driving rod 17 is made to move in the rightward direction as viewed in FIG. 1. In this case, a rightward driving force is applied to the lens barrel 1 from the driving rod 17 by the friction between the lens barrel 1 and the driving rod 17 and by the friction between the driving rod 17 and the leaf spring 14. However, the lens barrel 1 is held in a stationary state by inertia due to the mass of the lens barrel 1 and by the friction between the lens barrel 1 and the guide bar 3. Accordingly, while a pulse train such as that shown in FIG. 3(B) is being applied to the piezoelectric element 12, the lens barrel 1 is made to move progressively in the leftward direction as viewed in FIG. 1 by the application of each pulse in the above-described manner of operation.

Figure 4:
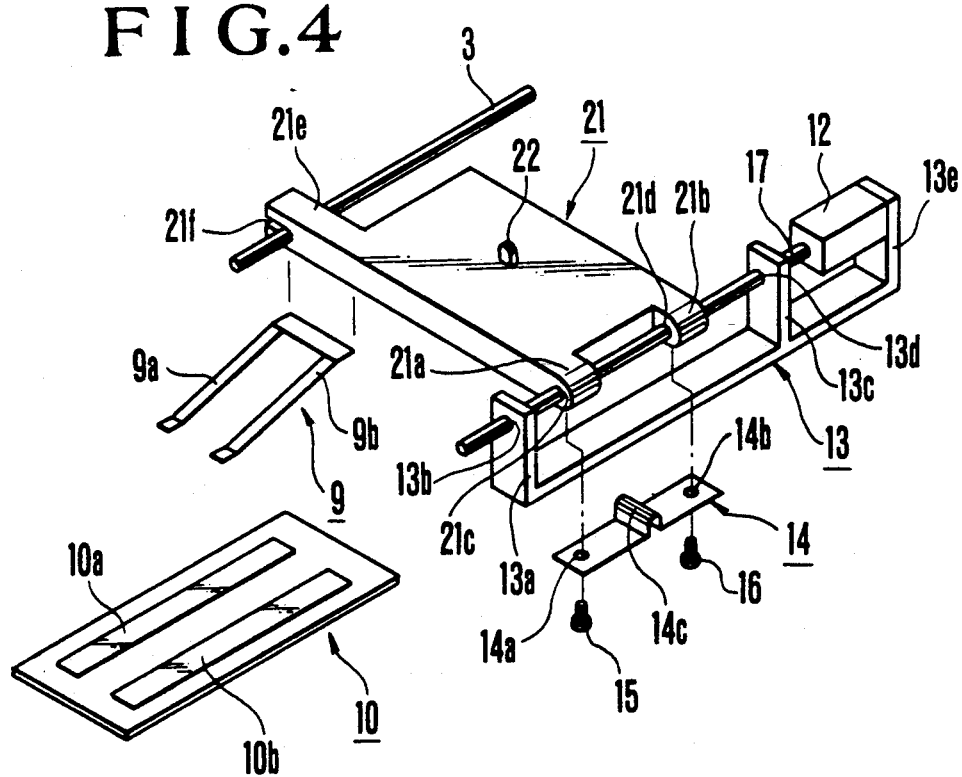
FIG. 4 is an exploded perspective view diagrammatically showing a magnetic-head driving device according to a second embodiment of the present invention.

FIG. 4 is a diagrammatic exploded perspective view showing a second embodiment of the present invention which is applied to a magnetic-head driving device for a still video camera. In FIG. 4, identical reference numerals are used to denote members which are substantially identical to those shown in FIG. 1, and description of the identical members is omitted unless required.

The arrangement of a control system in the second embodiment shown in FIG. 4 is substantially identical to that of the control system in the first embodiment, and the control system of the second embodiment is arranged in a manner similar to that shown in FIG. 2. Accordingly, description of the control system is also omitted. Driving pulses applied to the piezoelectric element 12 are substantially identical to those shown in FIGS. 3(A) and 3(B), and the operation of the second embodiment is also substantially identical to that of the first embodiment.

Referring to FIG. 4, a magnetic head 22 is secured to a head carriage 21. Projections 21a and 21b project from the left side edge of the head carriage 21 as viewed in FIG. 4, and holes 21c and 21d are formed to extend through the respective projections 21a and 21b, the driving rod 17 being inserted through the holes 21c and 21d. An arm 21e projects from the right side edge of the head carriage 21 as viewed in FIG. 4, and a U-shaped groove 21f is formed in the arm 21e, the guide bar 3 being inserted through the U-shaped groove 21f.

Holes into which the screws 15 and 16 are screwed are formed in the lower portions of the respective projections 21a and 21b. The leaf spring 14 has the curved projection 14c at the middle part and the through-openings 14a and 14b in the opposite end portions. The leaf spring 14 is secured to the undersides of the respective projections 21a and 21b by screwing the screws 15 and 16 into the aforesaid holes through the through-openings 14a and 14b. The curved projection 14c of the leaf spring 14 is pressed in contact with the underside of the driving rod 17 at a middle position between the projections 21a and 21b. Accordingly, the driving rod 17 is forced upwardly so that upper portions of the external surface of the driving rod 17 are pressed in contact with the respective upper portions of the inner surfaces of the holes 21c and 21d.

The slidable contact piece 9 is mounted on the underside of the arm 21e with an electrically insulating sheet interposed therebetween. The slidable contact piece 9 and the fixed detecting plate 10 disposed below the path of movement of the head carriage 21 constitute the position detector 19 (refer to FIG. 2) for detecting the position of the head carriage 21 which is in progressive movement.

The piezoelectric element 12 and the driving-rod supporting member 13 are substantially identical to those explained in connection with the first embodiment. The operation of the head carriage 21 and that of its associated control system are also substantially identical to those explained in connection with the first embodiment.

In either of the above-described embodiments, a potentiometer-type position detector is used to detect the position of a driven member, such as the lens barrel 1 or the head carriage 21, which progressively varies with time. However, as a matter of course, a non-contact detector may also be used to detect such a position.

As is apparent from the foregoing description, since the driving device according to either of the first and second embodiments employs a piezoelectric element as a driving source, it is not necessary to incorporate a motor, a speed reduction mechanism, a cam or a feed screw. Accordingly, it is possible not only to greatly reduce the size and weight of the driving device compared with conventional driving devices but also o achieve more accurate positioning control than would be the case if such a conventional driving device were used. In addition, fabrication cost and assembly cost can be greatly reduced. Accordingly, in accordance with either of the first and second embodiments of the present invention, it is possible to solve problems inherent in the conventional driving devices.

A third embodiment of the present invention will be described below with reference to FIGS. 7 and 8. In each of FIGS. 7 and 8, identical reference numerals are used to denote members which are used in common to the first embodiment.

Figure 7:
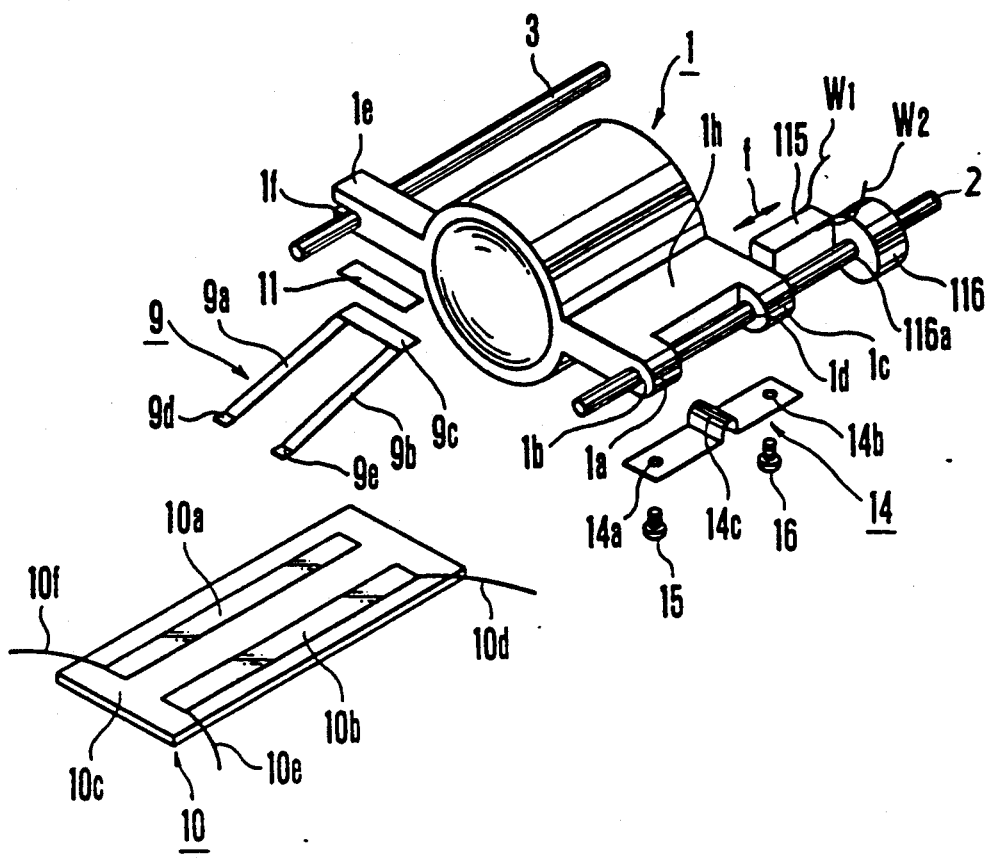
FIG. 7 is an exploded perspective view diagrammatically showing a lens-barrel driving device according to a third embodiment of the present invention.

In a lens driving device according to the third embodiment shown in FIG. 7, one end of a piezoelectric element 115 is secured to the rear end of the support plate 1h of the lens barrel 1, and a weight 116 is secured to the other end of the piezoelectric element 115.

The weight 116 has a hole 116a which extends through the same in the axial direction thereof, and a guide bar 2 is inserted through the hole 116a. The weight 116 is fitted onto the guide bar 2 for axial movement relative to each other. The piezoelectric element 115 has a structure which expands and contracts in the longitudinal direction. The piezoelectric element 115 is connected to the driving circuit 18 shown in FIG. 8 via the lead wires W1 and W2 leading from the piezoelectric element 115, and is driven to expand or contract in either of the directions indicated by an arrow f by a pulse voltage applied from the driving circuit 18.

The operation of the microcomputer 20 is similar to that shown in the flowchart of FIG. 6, and the waveforms of the voltage applied to the piezoelectric element 115 are identical to those shown in FIGS. 3(A) and 3(B).

When a driving pulse such as that shown in FIG. 3(A) is applied to the piezoelectric element 115, the piezoelectric element 115 rapidly expands at the vertical rising edge of the driving pulse at which this pulse changes from the voltage A to the voltage C. At this time, the lens barrel 1 and the weight 116 are made to move leftwardly and rightwardly as viewed in FIG. 7, respectively, by an amount determined by the inertia of the lens barrel 1 held in a stationary state, the inertia of the weight 116, resistance due to the mutual friction between the inner surfaces of the respective holes 1b and 1d of the lens barrel 1 and the guide bar 2, resistance due to the mutual friction between the inner surface of the U-shaped groove 1f and the guide bar 3, resistance due to the mutual friction the curved projection 14c of the leaf spring 14 and the guide bar 2, and the like.

Then, the piezoelectric element 115 slowly contracts at the falling edge of the driving pulse during which this pulse slowly changes from the voltage C to the voltage A. During this time, the lens barrel 1 is held in a stationary state by the frictional resistance among the lens barrel 1, the guide bar 2 and the guide bar 3 and by the frictional resistance between the leaf spring 14 and the guide bar 2, while the weight 116 alone is made to move in the leftward direction as viewed in FIG. 7. At the time when the contraction of the piezoelectric element 115 is completed, that is, at the time when the driving pulse returns to the voltage A, the lens barrel 1, the piezoelectric element 115 and the weight 116 start to move integrally in the leftward direction as viewed in FIG. 7 by kinetic energy due to the movement of the weight 116. When the kinetic energy of the weight 116 is consumed by the friction between each of the aforesaid portions, the motions of the lens barrel 1, the piezoelectric element 115 and the weight 116 come to a stop.

The above-described motion is repeated by the application of each driving pulse so that the lens barrel 1 is driven to move by a small amount in the leftward direction as viewed in FIG. 7. The position of the lens barrel 1 which is in progressive movement is detected by the position detector 19, and is fed back to the microcomputer 20.

When the lens barrel 1 is to be driven in the rightward direction as viewed in FIG. 7, a driving pulse such as that shown in FIG. 3(B) is applied to the piezoelectric element 115. When the rising edge of the driving pulse at which this pulse slowly changes from the voltage A to the voltage C is applied to the piezoelectric element 115, the piezoelectric element 115 slowly expands. During this time, the lens barrel 1 is held in a stationary state by the frictional resistance between the lens barrel 1 and the guide bar 2, by the frictional resistance between the lens barrel 1 and the guide bar 3 and by frictional resistance between the leaf spring 14 and the guide bar 2, while the weight 116 alone is made to move in the rightward direction as viewed in FIG. 7. At the time when the expansion of the piezoelectric element 115 is completed, the lens barrel 1, the piezoelectric element 115 and the weight 116 start to move integrally in the rightward direction as viewed in FIG. 7 by the kinetic energy of the weight 116. When the kinetic energy of the weight 116 is consumed by the friction between each of the aforesaid portions, the motions of the lens barrel 1, the piezoelectric element 115 and the weight 116 come to a stop.

Then, the piezoelectric element 115 rapidly contracts at the falling edge of the driving pulse at which this pulse rapidly changes from the voltage C to the voltage A. At this time, the lens barrel 1 and the weight 116 are made to move rightwardly and leftwardly as viewed in FIG. 7, respectively, by an amount determined by the inertia mass of the lens barrel 1, the inertia mass of the weight 116, and the frictional resistance between each of the aforesaid portions.

The above-described motion is repeated by the application of each driving pulse so that the lens barrel 1 is driven to move by a small distance in the rightward direction as viewed in FIG. 7.

In the above-described embodiment, a potentiometer-type position detector is used to detect the position of a driven member, i.e., the lens barrel 1, which is in progressive movement. However, as a matter of course, a non-contact detector may also be used to detect such a position.

As is apparent from the foregoing description, since the driving device according to the third embodiment employs a piezoelectric element secured to a weight as a driving source, it is not necessary to incorporate a motor, a speed reduction mechanism or a cam. Accordingly, it is possible not only to greatly reduce the size and weight of the driving device compared with conventional driving devices but also to achieve more accurate positioning control than would be the case if such a conventional driving device were used. In addition, fabrication cost and assembly cost can be greatly reduced. Accordingly, in accordance with the third embodiment of the present invention, it is possible to solve problems inherent in the conventional driving devices.

A fourth embodiment of the present invention will be described below with reference to FIG. 9.

Figure 9:
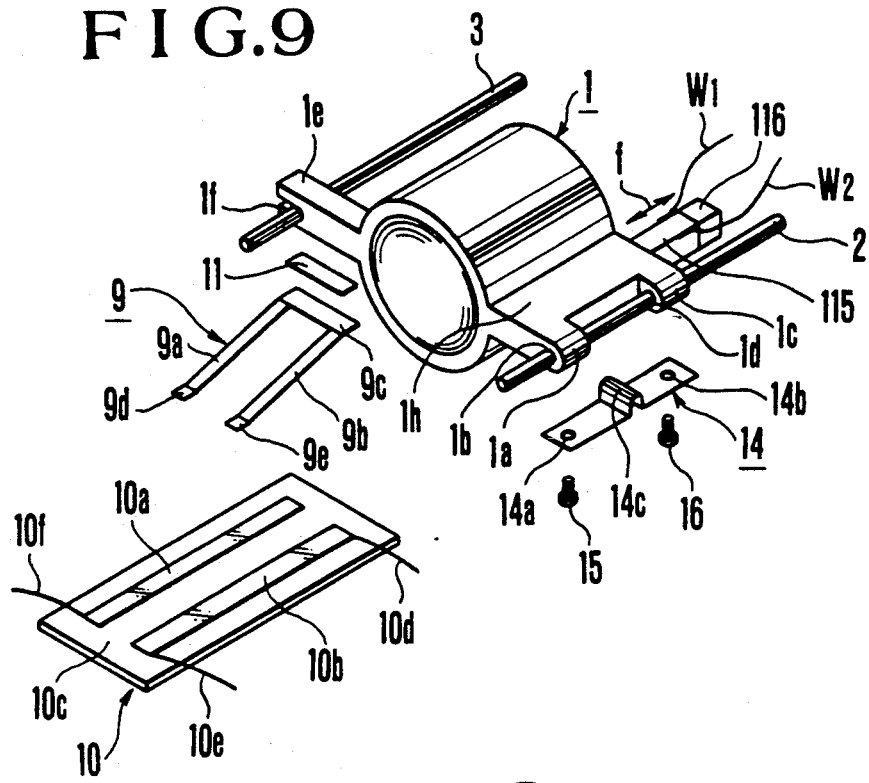
FIG. 9 is an exploded perspective view diagrammatically showing a lens-barrel driving device according to a fourth embodiment of the present invention.

In FIG. 9, identical reference numerals are used to denote members which are used in common to the first embodiment, and a detailed description is omitted.

Figure 8:
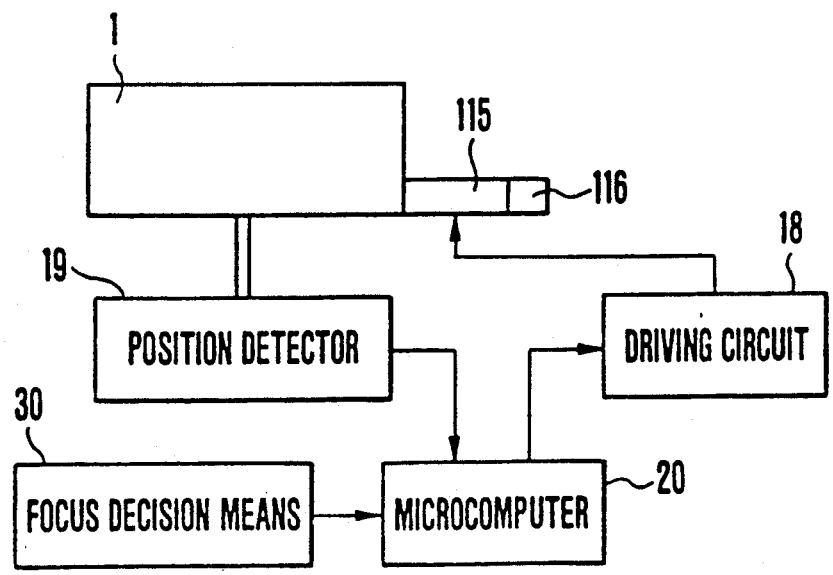
FIG. 8 is a schematic view of a control system for the driving device according to the third embodiment of the present invention.

The control system of a driving device according to the fourth embodiment is substantially identical to that shown in FIG. 8, and a diagrammatic illustration of the control system is omitted. The waveforms of driving pulses applied to a piezoelectric element are similar to those shown in FIGS. 3(A) and 3(B), and an illustration thereof is omitted. The flowchart showing the operation of a microcomputer is also omitted since it is similar to the flowchart of FIG. 6.

In a lens driving device according to the fourth embodiment of the present invention shown in FIG. 9, one end of the piezoelectric element 115 is secured to the rear end of the support plate 1h of the lens barrel 1. The piezoelectric element 115 is secured in the vicinity of the guide bar 2 so that the rotational force of the lens barrel can become small in a plane parallel to the guide bar 2, i.e., so that the lens barrel 1 can smoothly move along the guide bar 2. The weight 116 is secured to the other end of the piezoelectric element 115. The piezoelectric element 115 is connected to the driving circuit 18 of FIG. 8 by the lead wires W1 and W2, and is driven by a pulse voltage applied from the driving circuit 18 to expand or contract in either of the directions indicated by the arrow f.

Vertical threaded holes are formed in the lower portions of the respective projections 1a and 1c of the lens barrel 1, and the leaf spring 14 is mounted by the screws 15 and 16 to extent between the projections 1a and 1c. The leaf spring 14 has a through-opening 14a corresponding to the threaded hole of the projection 1a and a through-opening 14b corresponding to the threaded hole of the projection 1c, as well as the curved projection 14c which is formed so as to be pressed in contact with the underside of the guide bar 2 at an intermediate position between the projections 1a and 1c. When the leaf spring 14 is fixed to the undersides of the projections 1a and 1c, the guide bar 2 is relatively forced up with respect to the lens barrel 1, so that the guide bar 2 is elastically pressed in contact with upper portions of the inner surfaces of the respective holes 1b and 1d. Thus, the lens barrel 1 and the guide bar 2 are frictionally engaged with each other.

When a driving pulse such as that shown in FIG. 3(A) is applied to the piezoelectric element 115, the piezoelectric element 115 rapidly expands at the vertical rising edge of the driving pulse at which this pulse changes from the voltage A to the voltage C. At this time, the lens barrel 1 and the weight 116 are made to move in the leftward direction and in the rightward direction as viewed in FIG. 9, respectively, by an amount determined by the inertia of the lens barrel 1 held in a stationary state, the inertia of the weight 116, resistance due to the mutual friction between the inner surfaces of the respective holes 1b and 1d of the lens barrel 1 and the guide bar 2, resistance due to the mutual friction between the inner surface of the U-shaped groove 1f and the guide bar 3, resistance due to the mutual friction the curved projection 14c of the leaf spring 14 and the guide bar 2, and the like.

Then, the piezoelectric element 115 slowly contracts at the falling edge of the driving pulse during which this pulse slowly changes from the voltage C to the voltage A. During this time, the lens barrel 1 is held in a stationary state by the frictional resistance between the lens barrel 1 and the guide bars 2 and 3 and by the frictional resistance between he leaf spring 14 and the guide bar 2, while the weight 116 alone is made to move in the leftward direction as viewed in FIG. 9. At the time when the contraction of the piezoelectric element 12 is completed, i.e., at the time when the driving pulse returns to the voltage A, the lens barrel 1, the piezoelectric element 115 and the weight 116 start to move integrally in the leftward direction as viewed in FIG. 9 by kinetic energy due to the movement of the weight 116. When the kinetic energy of the weight 116 is consumed by the friction between each of the aforesaid portions, the motions of the lens barrel 1, the piezoelectric element 115 and the weight 116 come to a stop.

The above-described motion is repeated by the application of each driving pulse so that the lens barrel 1 is driven to move by a small amount in the leftward direction as viewed in FIG. 9. The position of the lens barrel 1 which is in progressive movement is detected by the position detector 19, and is fed back to the microcomputer 20.

When the lens barrel 1 is to be driven in the rightward direction as viewed in FIG. 9, a driving pulse such as that shown in FIG. 3(B) is applied to the piezoelectric element 115. When the rising edge of the driving pulse at which this pulse slowly changes from the voltage A to the voltage C is applied to the piezoelectric element 115, the piezoelectric element 115 slowly expands. During this time, the lens barrel 1 is held in a stationary state by the frictional resistance between the lens barrel 1 and the guide bar 2, by the frictional resistance between the lens barrel 1 and the guide bar 3 and by the frictional resistance between the leaf spring 14 and the guide bar 2, while the weight 116 alone is made to move in the rightward direction as viewed in FIG. 9. At the time when the expansion of the piezoelectric element 115 is completed, the lens barrel 1, the piezoelectric element 115 and the weight 116 start to move integrally in the rightward direction as viewed in FIG. 9 by the kinetic energy of the weight 116. When the kinetic energy of the weight 116 is consumed by the friction between each of the aforesaid, the motions of the lens barrel 1, the piezoelectric element 115 and the weight 116 come to a stop.

Then, the piezoelectric element 115 rapidly contracts at the falling edge of the driving pulse at which this pulse rapidly changes from the voltage C to the voltage A. At this time, the lens barrel 1 and the weight 116 are made to move rightwardly and leftwardly as viewed in FIG. 1, respectively, by an amount determined by the inertia mass of the lens barrel 1, the inertia mass of the weight 116, and the frictional resistance between each of the aforesaid portions.

The above-described motion is repeated by the application of each driving pulse so that the lens barrel 1 is driven to move by a small distance in the rightward direction as viewed in FIG. 9.

Figure 10:
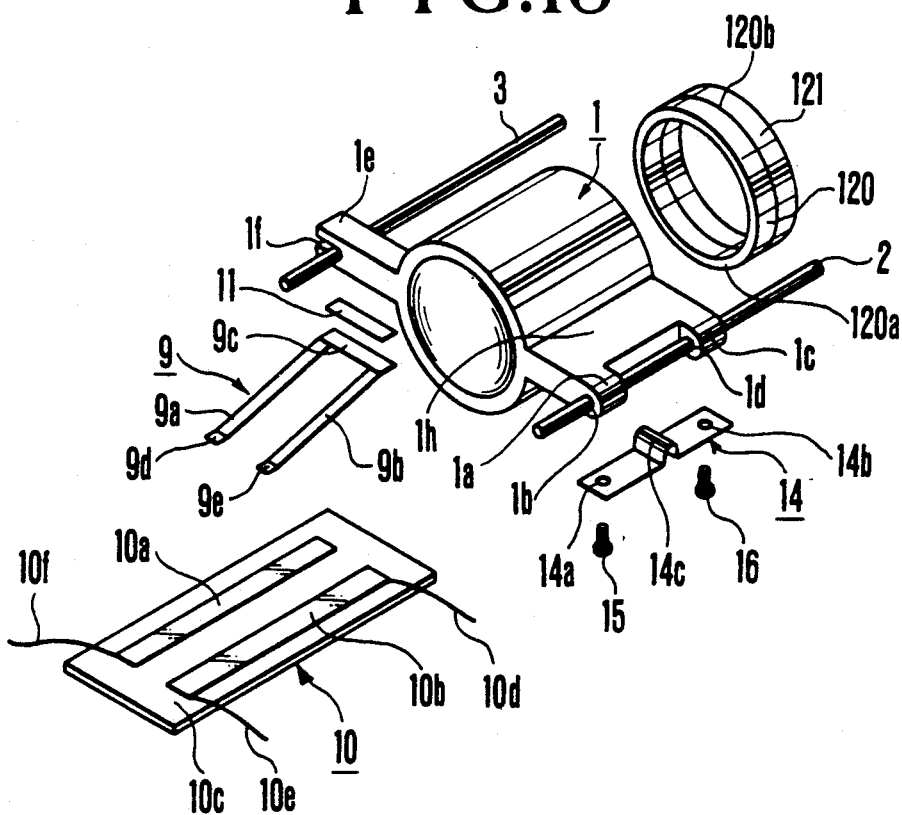
FIG. 10 is an exploded perspective view diagrammatically showing a lens-barrel driving device according to a fifth embodiment of the present invention.

FIG. 10 is a diagrammatic exploded perspective view of a fifth embodiment of the present invention. The fifth embodiment is substantially identical to the fourth embodiment except that a ring-shaped piezoelectric element 120 and a ring-shaped weight 121 are employed. A front end face 120a of the piezoelectric element 120 is secured to the rear end face of the lens barrel 1, and the weight 121 is secured to a rear end face 120b of the piezoelectric element 120. If the ring-shaped piezoelectric element 120 is used as in the case of the fifth embodiment, the area of contact between the piezoelectric element 120 and the lens barrel 1 becomes large and, therefore, a large driving force can be obtained. In addition, since the area of adhesion between the lens barrel 1 and the piezoelectric element 120 is also large, it is possible to reduce the possibility that the piezoelectric element 120 will come off by the application of a large impact or the like.

The arrangement of a control system in the fifth embodiment is substantially identical to that of the control system in the fourth embodiment, and the waveforms of driving pulses applied to the piezoelectric element 120 and the operation of the entire device are also substantially identical to those explained in connection with the fourth embodiment Therefore, description is omitted.

In the above-described fifth embodiment, a potentiometer-type position detector is used to detect the position of a driven member, such as the lens barrel 1 or the head carriage 21, which is in progressive movement. However, as a matter of course, a non-contact detector may also be used to detect such a position.

As is apparent from the foregoing description, since the driving device according to either of the fourth and fifth embodiments employs a piezoelectric element as a driving source and the piezoelectric element is brought into direct contact with a lens barrel, it is not necessary to incorporate a motor, a speed reduction mechanism, a cam or the like. Accordingly, it is possible not only to greatly reduce the size and weight of the driving device compared with conventional driving devices but also to achieve more accurate positioning control than would be the case if such a conventional driving device were used. In addition, fabrication cost and assembly cost can be greatly reduced.

Figure 11:
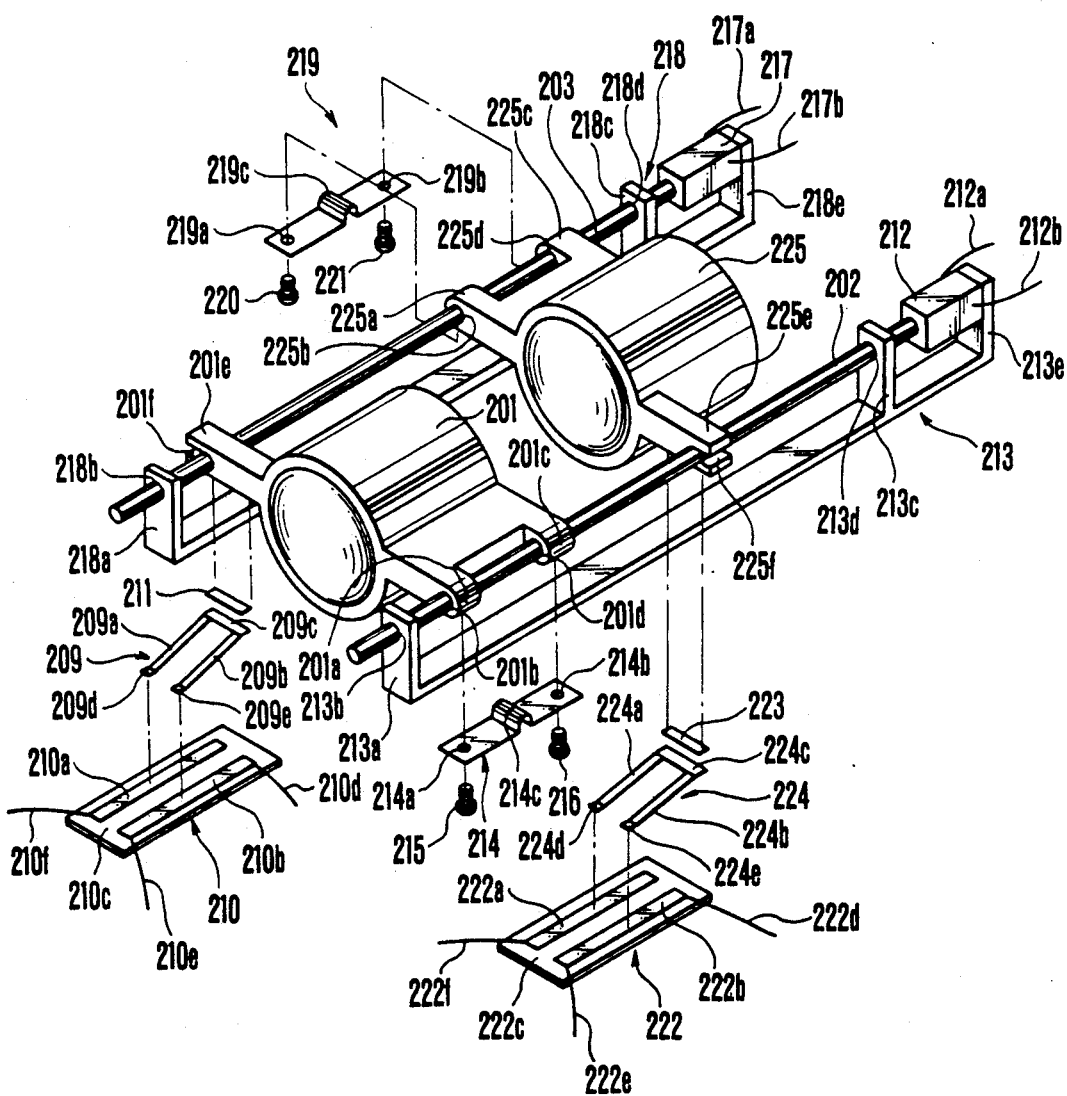
FIG. 11 is an exploded perspective view diagrammatically showing a lens-barrel driving device according to a sixth embodiment of the present invention.
Figure 12:
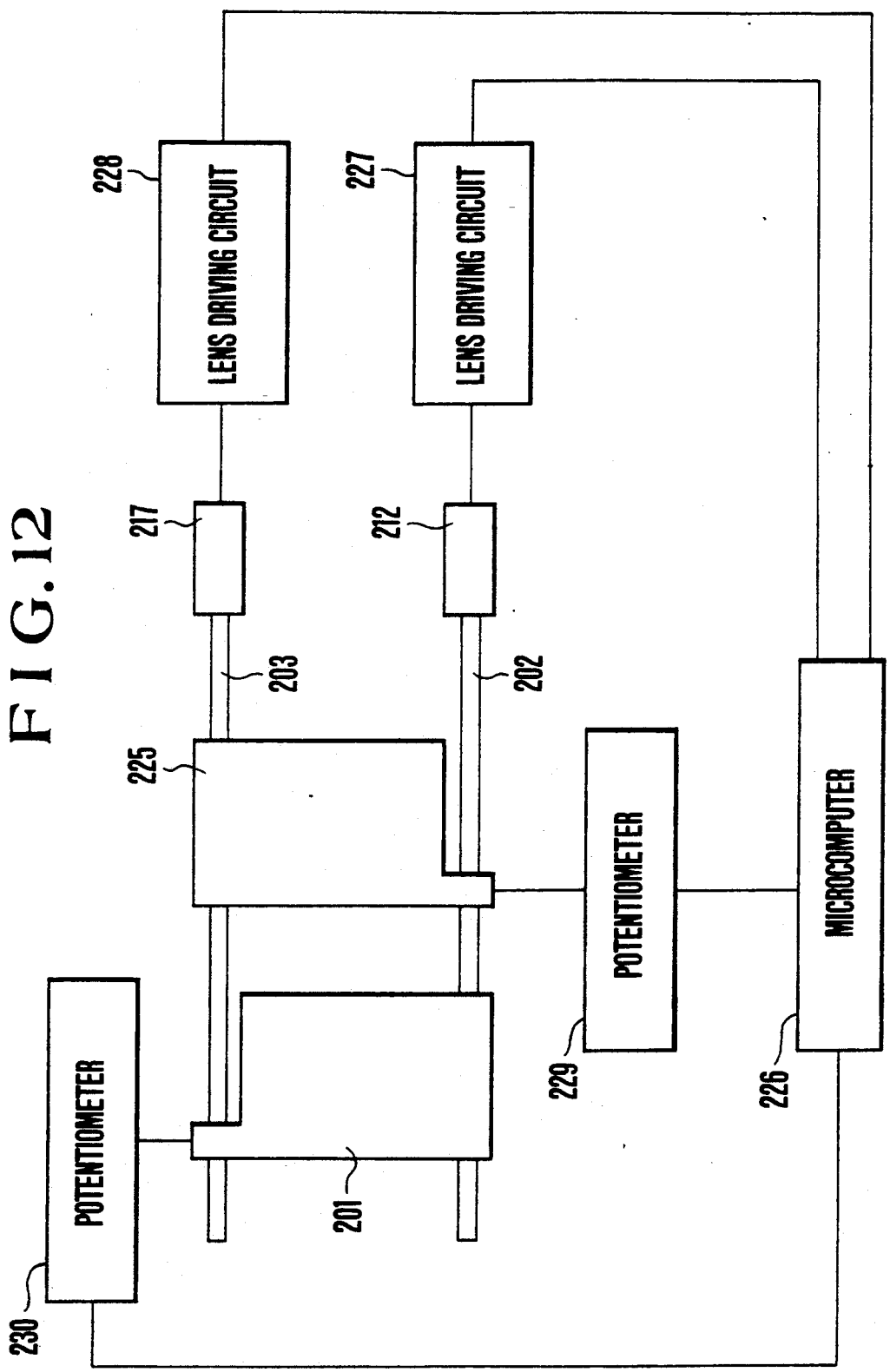
FIG. 12 is a schematic block diagram showing a control system for the driving device according to the sixth embodiment of the present invention.

FIG. 11 is a diagrammatic exploded perspective view showing a sixth embodiment of the present invention. FIG. 12 is a schematic block diagram showing primary parts of a system according to the sixth embodiment.

Referring to FIG. 11, a lens barrel 201 is slidably fitted onto a shaft 202 by means of holes 201b and 201d. The shaft 202, which is disposed to extend along the optical axis, is fixed at one end to a piezoelectric element 212, as by an adhesive. A support member 213 is secured to a fixed portion (not shown) within a lens unit (not shown), and holes 213b and 213d are respectively formed in upright portions 213a and 213c of the support member 213. The shaft 202 is supported for sliding movement through the holes 213b and 213d. The piezoelectric element 212 expands and contracts in the longitudinal direction by the application of a voltage through lead wires 212a and 212b. The shaft 202 is secured to one end of the piezoelectric element 212 relative to the directions of expansion and contraction thereof, while the other end of the piezoelectric element 212 is secured to an upright portion 213e of the support member 213.

A leaf spring 214 has a curved projection 214c of U-like cross section at its lengthwise mid portion and through-openings 214a and 214b at its lengthwise opposite end portions. The leaf spring 214 is secured to projections 201a and 201c of the lens barrel 201 by screws 215 and 216 inserted through the respective through-openings 214a and 214b, and the curved projection 214c is elastically pressed against the shaft 202.

In the above-described arrangement, the leaf spring 214 acts to bias the shaft 202 in the holes 201b and 201d, thereby producing frictional forces between the inner surface of the hole 201b and the shaft 202, between the inner surface of the hole 201c and the shaft 202, and between the curved projection 214c and the shaft 202. A brush 209 which serves as a slidable contact piece is secured to the reverse side of an arm 201e, as viewed in FIG. 11, with an electrical insulator 211 interposed therebetween. The brush 209 has bent portions 209d and 209e which are respectively arranged for sliding movement over a conductor part 210a and a resistor part 210b provided on a resistor board 210 secured to the fixed member within the lens unit.

A lens barrel 225 is slidably fitted onto a shaft 203 by means of holes 225b and 225d. The shaft 203, which is disposed to extend along the optical axis, is fixed at one end to a piezoelectric element 217. A support member 218 is secured to the fixed portion within the lens unit, and holes 218b and 218d are respectively formed in upright portions 218a and 218c of the support member 218. The shaft 203 is supported for sliding movement through the holes 218b and 218d. The piezoelectric element 217 expands and contracts in the longitudinal direction by the application of a voltage through lead wires 217a and 217b. The shaft 203 is secured to one end of the piezoelectric element 217 relative to the directions of expansion and contraction thereof, while the other end of the piezoelectric element 217 is secured to an upright portion 218e of the support member 218.

A leaf spring 219 has a configuration similar to that of the leaf spring 214, and is secured to projections 225a and 225c of the lens barrel 225 by screws 220 and 221 inserted through respective through-openings 219a and 219b. Thus, the curved projection 219c is elastically pressed against the shaft 203.

In the above-described arrangement, the leaf spring 219 acts to bias the shaft 203 in the holes 225b and 225d, thereby producing frictional forces between the inner surface of the hole 225b and the shaft 203, between the inner surface of the hole 225c and the shaft 203, and between the curved projection 219c and the shaft 203. A brush 224 which serves as a slidable contact piece is secured to the reverse side of an arm 225e, as viewed in FIG. 11, with an electrical insulator 223 interposed therebetween. The brush 224 has bent portions 224d and 224e which are respectively arranged for sliding movement over a conductor part 222a and a resistor part 222b provided on a resistor board 222 secured to the fixed member within the lens unit.

Referring to FIG. 12, a microcomputer 226 constitutes a system controller in an imaging apparatus such as a camera, and outputs to lens driving circuits 227 and 228 approximately sawtooth-shaped driving pulses such as those shown in FIGS. 3(A) and 3(B). The lens driving circuits 227 and 228 receive driving pulses of about 5V from the microcomputer 226 and output driving pulses, such as those shown in FIGS. 3(A) and 3(B), of the order of some tens of volts up to one hundred volts which are required to drive the piezoelectric elements 212 and 217. A potentiometer 229 practically consists of the brush 209 and the resistor board 210 which are shown in FIG. 11, while a potentiometer 230 practically consists of the brush 224 and the resistor board 222 which are shown in FIG. 11.

The operation of the above-described sixth embodiment will be described below.

Driving of Lens Barrel 201

FIG. 3(A) shows a driving waveform for use in driving the lens barrel 201 in the rightward direction as viewed in FIG. 11. FIG. 3(B) shows a driving waveform for use in driving the lens barrel 201 in the leftward direction as viewed in FIG. 11. In each of FIGS.

3(A) and 3(B), the vertical axis and the horizontal axis represent voltage and time, respectively.

If the piezoelectric element 212 is supplied with a driving voltage, such as that shown in FIG. 3(A), through the lead wires 212a and 212b, the driving voltage changes from the predetermined voltage A to the predetermined voltage C which is higher than the voltage A. The rise B of the driving voltage is of extremely short duration, so that the piezoelectric element 212 rapidly expands in the longitudinal direction. Simultaneously, the shaft 202 is also made to move rapidly in the leftward direction as viewed in FIG. 11 by an amount equivalent to the amount of expansion of the piezoelectric element 212. The rapid leftward movement of the shaft 202 acts to move the lens barrel 201 in the leftward direction as viewed in FIG. 11 by the friction between the curved projection 214c of the leaf spring 214 and the shaft 202 and the friction between the shaft 202 and the inner surfaces of the respective holes 201b and 201d of the lens barrel 201. However, the lens barrel 201 (which is hereinafter assumed to include an internally fixed lens) remains stationary due to the inertia of the mass of its own.

Then, the driving voltage changes from the voltage C to the voltage A. The fall D has long duration compared with the rise B. Accordingly, as the shaft 202 is made to move rightwardly as viewed in FIG. 11 with the contraction of the piezoelectric element 212, the lens barrel 201 is made to move rightwardly as viewed in FIG. 11 by the frictional force between the lens barrel 201 and the shaft 202 and the frictional force between the leaf spring 214 and the shaft 202. Then, at the time when the contraction of the piezoelectric element 212 is completed, i.e., at the time when the driving voltage returns to the voltage A, the rightward movement of the shaft 202 rapidly comes to a stop. However, the lens barrel 201 continues to move rightwardly as viewed in FIG. 11, and comes to a stop until the aforesaid kinetic energy is consumed by the friction between the lens barrel 201 and the shaft 202 and the friction between the leaf spring 214 and the shaft 202.

The above-described motion is repeated, that is, while the shaft 202 is rapidly moving leftwardly as viewed in FIG. 11, the lens barrel 201 does not move, and while the shaft 202 is slowly moving rightwardly as viewed in FIG. 11, the lens barrel 201 is made to move together with the shaft 202 in the rightward direction as viewed in FIG. 11. During the above-described motion, the position of the lens barrel 201 is detected sequentially in time by the resistor board 210 and the brush 209, whereby the lens barrel 201 is made to move to a predetermined position.

When the lens barrel 201 is to be moved in an opposite direction (leftwardly as viewed in FIG. 11), driving opposite to the above-described driving is performed by the application of a driving voltage having a slow rise and a sharp fall as shown in FIG. 3(B). The piezoelectric element 212 slowly expands by the change of the driving voltage from the voltage A to the voltage C, and the lens barrel 201 and the shaft 202 are made to move integrally in the leftward direction as viewed in FIG. 11 by the friction between the shaft 202 and the inner surfaces of the holes 201b and 201d of the lens barrel 201 and the friction between the shaft 202 and the curved projection 214c of the leaf spring 214. At the time when the expansion of the piezoelectric element 212 is completed, i.e., at the time when the driving voltage reaches the voltage C, the shaft 202 comes to a stop, but the lens barrel 201 continues to move until kinetic energy is consumed by the friction between the lens barrel 201 and the shaft 202 and the friction between the leaf spring 214 and the shaft 202.

Then, when the driving voltage rapidly changes from the voltage C to the voltage A, the piezoelectric element 212 contracts and the shaft 202 is made to move in the rightward direction as viewed in FIG. 11. This motion acts to cause the lens barrel 201 to move rightwardly as viewed in FIG. 11 by the friction between the shaft 202 and the lens barrel 201 and the friction between the shaft 202 and the leaf spring 214, but the lens barrel 201 is held in a stationary state by the inertia of the mass of its own.

The lens barrel 201 is made to move leftwardly as viewed in FIG. 11 by repeating the above-described driving.

The lens barrel 201 is rectilinearly guided by the shaft 202, but is inhibited from rotating about the shaft 202 by the shaft 203. The shaft 203 is, as described later, displaced in the axial direction so that the lens barrel 225 can be made to move by the piezoelectric element 217. However, the displacement of the shaft 203 does not influence the displacement of the lens barrel 201 because the friction between the shaft 203 and a groove 201f of U-shaped cross section of the lens barrel 201 is kept extremely small by the fraction between the leaf spring 214 and the shaft 202 and the friction between the shaft 202 and the inner surfaces of the holes 201b and 201d of the lens barrel 201.

Driving of Lens Barrel 225

A driving mechanism for the lens barrel 225 is similar to the above-described driving mechanism for the lens barrel 201. Accordingly, the lens barrel 225 can be made to move rightwardly or leftwardly as viewed in FIG. 11 by applying a voltage of the waveform shown in FIG. 3(A) or 3(B) to the piezoelectric element 217.

As described above, the shafts 202 and 203 for rectilinearly guiding the respective lens barrels 201 and 225 are axially displaced by the associated piezoelectric elements 212 and 217, but driving force can be selectively transmitted by selectively coupling the respective lens barrels 201 and 225 to the shafts 202 and 203 by frictional force.

As is apparent from the foregoing description, in accordance with the sixth embodiment, a driven member axially moves along a guide member which is being made to move back and forth by the application of an electric field to an electrical-mechanical energy converting element, for example, a piezoelectric element. Accordingly, in the case of, for example, a lens barrel, a guide shaft used for supporting a lens can be utilized as a driving shaft and, in addition, another driving shaft can be utilized as a member for limiting the rotation of the driven member. Accordingly, since it is not necessary to provide a special member for rotation limitation, it is possible to miniaturize the size of the entire device.

A seventh embodiment of the present invention will be described below with reference to FIGS. 13 to 16.

Figure 13:
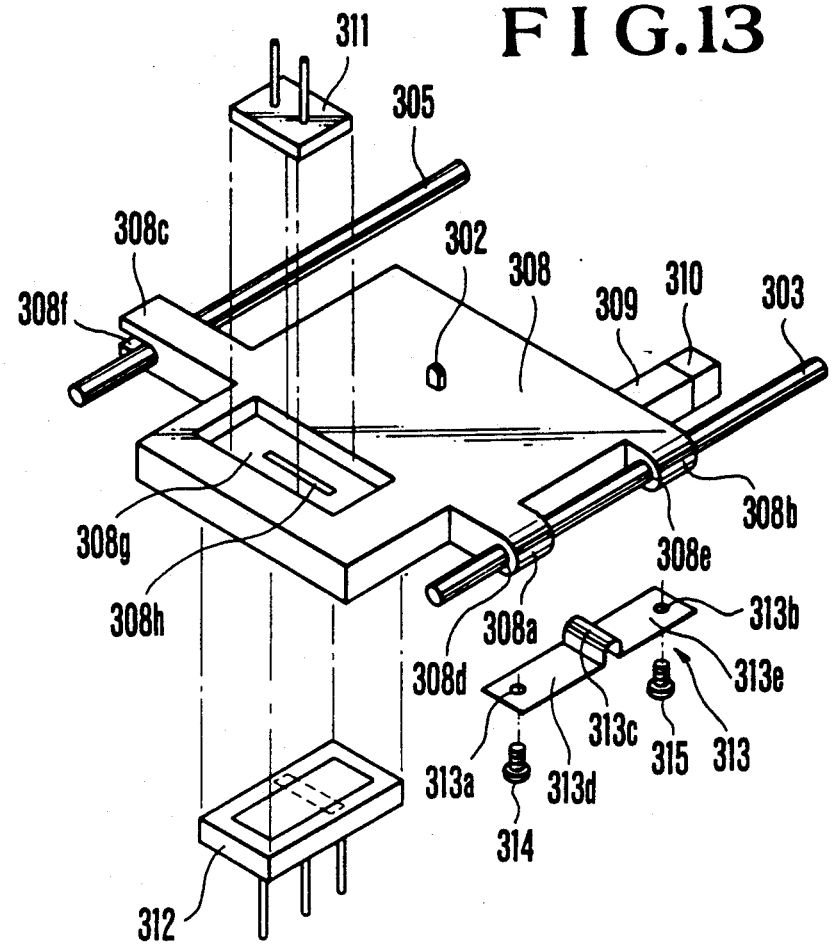
FIG. 13 is an exploded perspective view diagrammatically showing a seventh embodiment in which the present invention is applied to a head driving device.
Figure 14:
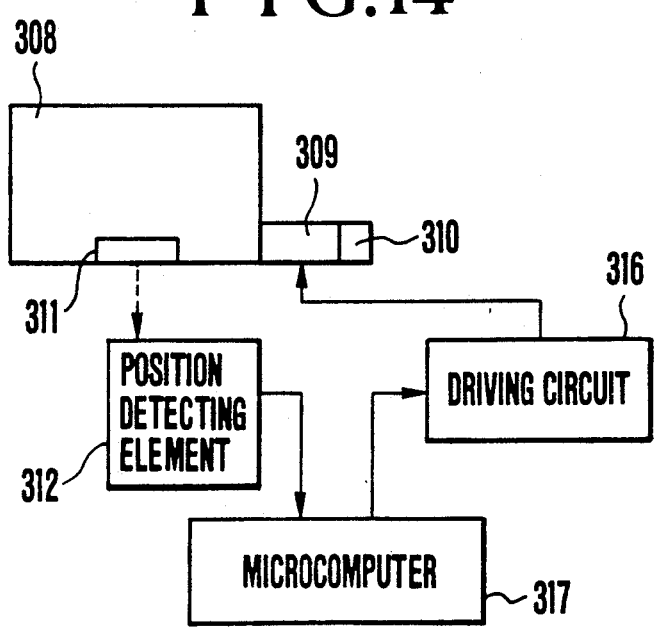
FIG. 14 is a schematic block diagram showing a control system for the head driving device of FIG. 13.

In the seventh embodiment, a driving mechanism according to the present invention is applied to a head driving device. Referring to FIG. 13, a head carriage which is one constituent part for the head driving device is denoted by 308, and the head carriage 308 has two projections 308a and 308b on one side and one projection 308c on another side. Holes 308d and 308e are formed to extend through the respective projections 308a and 308b, and a first guide bar 303 is relatively slidably inserted into the holes 308d and 308e. A groove 308f of U-shaped cross section is formed in the end portion of the projection 308c, and a second guide bar 305 is relatively slidably inserted through the groove 308f. A piezoelectric element 309 which is elongated in a direction parallel to the guide bars 303 and 305 is secured at its one end to the rear end face of the head carriage 308, and a weight 310 is secured to the other end of the piezoelectric element 309. The piezoelectric element 309 is of a type which expands parallel to its own longitudinal axis by the application of a voltage, and the driving circuit 316 shown in FIG. 14 is electrically connected to the piezoelectric element 309.

A recess 308g is formed in the head carriage 308 in the vicinity of the front end thereof (the left end as viewed in FIG. 13), and a light emitting element 311 which has a bottom face serving as a light emitting face is disposed in the recess 308g. A slit 308h, which is elongated in a direction perpendicular to the guide bars 303 and 305 (that is, in a direction perpendicular to the direction of movement of the head carriage 308), is formed in the bottom of the recess 308g to extend therethrough. Light emitted from the light emitting element 311 passes through the slit 308h and is projected downwardly from the head carriage 308 as a narrow beam of light.

A semiconductor position detecting element 312 having a rectangular shape which is elongated in a direction parallel to the direction of movement of the head carriage 308 is secured to a fixed member (not shown) immediately below the path of movement of the head carriage 308. The semiconductor position detecting element 312 is electrically connected to the driving circuit 316 shown in FIG. 14.

Vertical threaded holes are formed in the lower portions of the respective projections 308a and 308b of the head carriage 308. A leaf spring 313 extends parallel to the guide bar 303 between the projections 308a and 308b. The leaf spring 313 has through-openings 313a and 313b which are respectively formed in its opposite end portions, and is mounted on the undersides of the respective projections 308a and 308b by screwing screws 314 and 315 into the respective threaded holes which are in alignment with the through-openings 313a and 313b. A curved projection 313c to be elastically pressed in contact with the underside of the guide bar 303 is formed at the middle of the leaf spring 313. By pressing the curved projection 313c in contact with the underside of the guide bar 303, upper portions of the external surface of the guide bar 303 are pressed in contact with the respective upper portions of the inner surfaces of the holes 308b and 308e. By the above-described arrangement, the mutual friction between the head carriage 308 and the guide bar 303 is enhanced, and only if a force which overcomes the mutual friction is applied to the head carriage 308, the head carriage 308 can be made to move.

FIG. 14 is a schematic block diagram showing a control system for controlling the movement and positioning of the head carriage 308. A driving circuit 316 applies a sawtooth driving pulse as high as some tens of volts up to one hundred volts, such as that shown in FIG. 3(A) or 3(B), to the piezoelectric element 309. The driving circuit 316 is driven by an about 5V driving pulse of the same waveform which is applied from a microcomputer 317. The piezoelectric element 309 rapidly expands at the vertical rising edge of the driving pulse. At this time, the head carriage 308 is made to slide on the guide bar 303 because a force which is generated from the piezoelectric element 309 in the direction of expansion thereof is greater than the mutual frictional force between the guide bar 303 and the inner surfaces of the holes 308d and 308e of the head carriage 308. At the non-vertical falling edge of the driving pulse, the piezoelectric element 309 slowly contracts, so that the head carriage 308 remains stationary because a force which acts in the direction of contraction at that time is less than the mutual frictional force between the guide bar 303 and the inner surfaces of the holes 308d and 308e of the head carriage 308. In other words, the head carriage 308 performs a fine inching motion by the expansion and contraction of the piezoelectric element 309. The position of the moving head carriage 308 and the amount of movement thereof are detected by the semiconductor position detecting element 312 in the form of an electrical output which corresponds to the position of slit-shaped light (shown by a dashed line in FIG. 13) which is projected from the light emitting element 311 onto the semiconductor position detecting element 312 through the slit 308h. The output from the semiconductor position detecting element 312 is inputted to the microcomputer 317, which controls the driving circuit 316.

The operation of the above-described driving mechanism will be described below with reference to FIGS. 13 and 14 as well as FIGS. 3(A) and 3(B).

FIG. 3(A) shows the waveform of a driving pulse which is applied to the piezoelectric element 309 in order to move the head carriage 308 in the leftward direction as viewed in FIG. 13. FIG. 3(B) shows the waveform of a driving pulse which is applied to the piezoelectric element 309 in order to move the head carriage 308 in the rightward direction as viewed in FIG. 13.

When a driving pulse such as that shown in FIG. 3(A) is applied to the piezoelectric element 309, the piezoelectric element 309 rapidly expands at the vertical rising edge of the driving pulse at which this pulse changes from the voltage A to the voltage C. At this time, the head carriage 308 is subjected to a leftward driving force which is greater than the sum of inertia force based on the mass of the head carriage 308, the friction between the guide bar 303 and the inner surfaces of the holes 308d and 308e of the head carriage 308, the friction between the guide bar 305 and the inner surface of the groove 308f, the friction between the guide bar 303 and the curved projection 313c of the leaf spring 313, and the like. Accordingly, as viewed in FIG. 13, the head carriage 308 is made to move leftwardly by a small amount, while the weight 310 is made to move rightwardly by a small amount. While the driving pulse is maintained at its maximum level (voltage C), the piezoelectric element 309 is held in an expanded state. Then, the piezoelectric element 309 contracts at the falling edge D of the driving pulse during which this pulse non-vertically changes from the voltage C to the voltage A. Because the voltage applied to the piezoelectric element 309 does not rapidly change, a force resulting from the contraction of the piezoelectric element 309 is less than the sum of inertia force of the head carriage 308, the frictional force between the guide bar 303 and the curved projection 313c of the leaf spring 313, the frictional force between the guide bar 303 and the inner surfaces of the holes 308d and 308e of the head carriage 308, the frictional force between the guide bar 305 and the inner surface of the groove 308f, and the like. Accordingly, the head carriage 308 comes to a stop, and the weight 310 alone is made to move leftwardly as viewed in FIG. 13 with the contraction of the piezoelectric element 309. At the time when the contraction of the piezoelectric element 309 is completed, i.e., at the time when the driving pulse returns to the voltage A, the head carriage 308, the piezoelectric element 309 and the weight 310 are made to move integrally in the leftward direction by the leftward kinetic energy of the weight 310. When such energy is consumed, the head carriage 308 comes to a stop.

The above-described operation is repeated by the application of each driving pulse, whereby the head carriage 308 is made to move leftwardly by a predetermined small amount at a time. The amount of movement of the head carriage 308 and the instantaneous position thereof which varies with the movement are, as described above, detected by the semiconductor position detecting element 312 and fed back to the microcomputer 317. Accordingly, when the head carriage 308 is made to move to a predetermined position, the application of the driving pulse to the piezoelectric element 309 is stopped by the microcomputer 317.

When the head carriage 308 is to be moved in the rightward direction as viewed in FIG. 13, the microcomputer 317 causes the driving circuit 316 to apply a driving pulse such as that shown in FIG. 3(B) to the piezoelectric element 309. More specifically, when a voltage which non-vertically rises from the voltage A to the voltage C is applied to the piezoelectric element 309, the piezoelectric element 309 starts to expand slowly. The force of this expansion is smaller than the sum of the inertia force of the head carriage 308 and the frictional forces occurring at the aforesaid portions. Accordingly, although the piezoelectric element 309 expands, the head carriage 308 is held in a stationary state and the weight 310 alone is made to move rightwardly as viewed in FIG. 13 with the expansion of the piezoelectric element 309. Then, at the time when the expansion of the piezoelectric element 309 is completed, the head carriage 308, the piezoelectric element 309 and the weight 310 start to move integrally in the rightward direction as viewed in FIG. 13 by the kinetic energy of the weight 310. When the kinetic energy is consumed by the frictions occurring at the above-described portions, the head carriage 308 and the weight 310 come to a stop. Then, when the voltage vertically changes from the voltage C to the voltage A, the piezoelectric element 309 rapidly contracts, whereby the head carriage 308 is made to move in the rightward direction as viewed in FIG. 13, while the weight 310 is made to move in the leftward direction. The above-described operation is repeated by the application of each driving pulse, whereby the head carriage 308 is made to move progressively in the rightward direction as viewed in FIG. 13. During the aforesaid process, light from the light emitting element 311 mounted on the head carriage 308 is projected onto the semiconductor position detecting element 312 through the slit 308h. Since the slit-shaped light projected on the semiconductor position detecting element 312 move thereon with the movement of the head carriage 308, the instantaneous position of the head carriage 308 which varies with the movement is detected by the semiconductor position detecting element 312 and the output therefrom is fed back to the microcomputer 317, whereby the amount of movement of the head carriage 308 and the stop position thereof are controlled.

Although in this embodiment the semiconductor instantaneous position of the head carriage 308, a different detecting means such as a linear encoder or a potentiometer may, of course, be employed in place of the element 312.

The operation of the leaf spring 313 for causing a frictional force to act between the guide bar 303 and the head carriage 308 will be described below.

To produce such a frictional force stably and to prevent the elastic force of the leaf spring 313 from acting in the direction of displacement of the head carriage 308, the curved projection 313c of U-shaped cross section is formed at the middle of the leaf spring 313 so that the elastic force of the leaf spring 313 can be applied to the guide bar 303 approximately perpendicularly. When the leaf spring 313 is elastically deformed in the direction of expansion or contraction of the piezoelectric element 309 by the expansion or contraction of the same, the frictional force between the guide bar 313 and the head carriage 308 varies and the elastic force acts in the direction of displacement of the head carriage 308, so that the displacement of the head carriage 308 becomes unstable. To prevent this problem, the leaf spring 313 has flat portions 313d and 313e which extend parallel to the directions of expansion and contraction of the piezoelectric element 309, and is formed to have a high rigidity in these directions. Other examples of this leaf spring are shown in FIGS. 15(A), 15(B), 15(C) and 16.

Figure 15A:
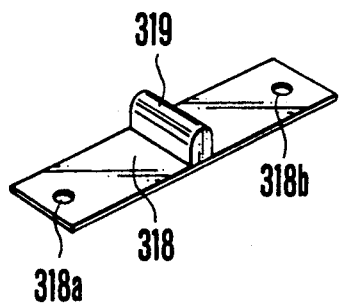
FIGS. 15(A), 15(B) and 15(C) are perspective views diagrammatically showing different examples of a leaf spring.

Referring to FIG. 15(A), a leaf spring 318 of flat shape has holes 318a and 318b for securing the leaf spring 318 to the projections 308a and 308b of the head carriage 308. A frictional member 319 is formed of a material, such as metal or resin, which has a high rigidity at least in the directions of expansion and contraction of the piezoelectric element 309. The frictional member 319 is secured to the middle of the leaf spring 318.

Although the leaf spring 313 in the embodiment shown in FIG. 13 exhibits more or less spring properties at the upward rising portion of the curved projection 313c, the example of FIG. 15(A) exhibits a higher rigidity than the leaf spring 313 in the directions of expansion and contraction of the piezoelectric element 309.

Figure 15B:
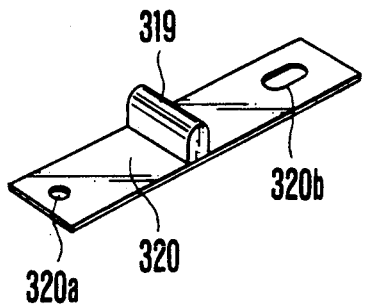
Figure 16:
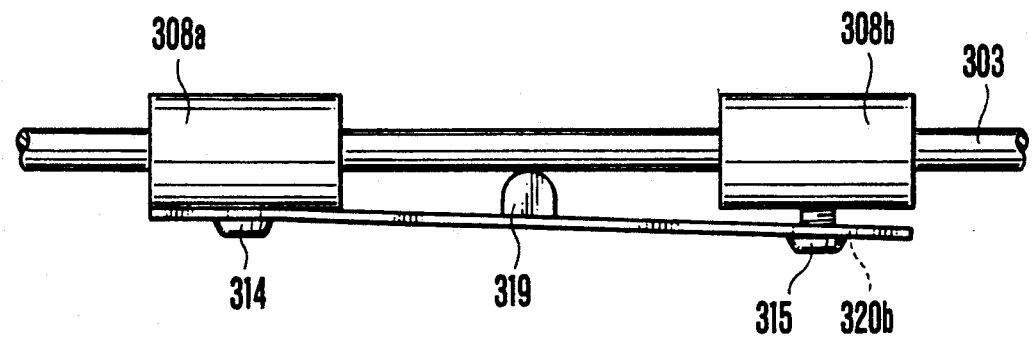
FIG. 16 is a schematic cross-sectional view showing the state of mounting of the leaf spring shown in FIG. 15(b)

FIG. 15(B) shows a leaf spring which facilitates adjustment of frictional force. A leaf spring 320 has a hole 320a and a slot 320b for securing the leaf spring 320 to the projections 308a and 308b of the head carriage 308 by means of the respective screws 314 and 315. FIG. 16 is a diagrammatic view showing the assembled state of the leaf spring 320. The leaf spring 320 is tightly secured to the projection 308a by the screw 314 at the position of the hole 320a. The frictional member 319 is pressed against the guide bar 303 by the leaf spring 320. The screw 315 is screwed into the projection 308b through the slot 320b, and the tightening strength of the screw 315 can be adjusted to change the state of bend of the leaf spring 320, thereby adjusting the pressure of an elastic member against the guide bar 303. After this adjustment has been performed, the screw 315 is fixed by an adhesive.

Figure 15C:
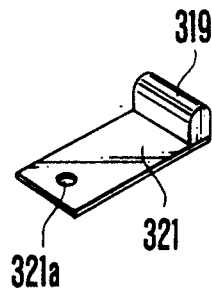

FIG. 15(C) shows a leaf spring 321 having one flat portion to which the frictional member 319 is secured. The leaf spring 321 is secured to the projection 308a by the screw 314 passed through a hole 321a.

As is apparent from the foregoing description, in accordance with the seventh embodiment, since a transmission mechanism such as a gear train which would have conventionally been required is not needed, it is possible to reduce the size and weight of the driving device. It is also possible to stably generate frictional force, particularly for a driven member so that the positioning accuracy of the driven member can be improved.

Figure 17:
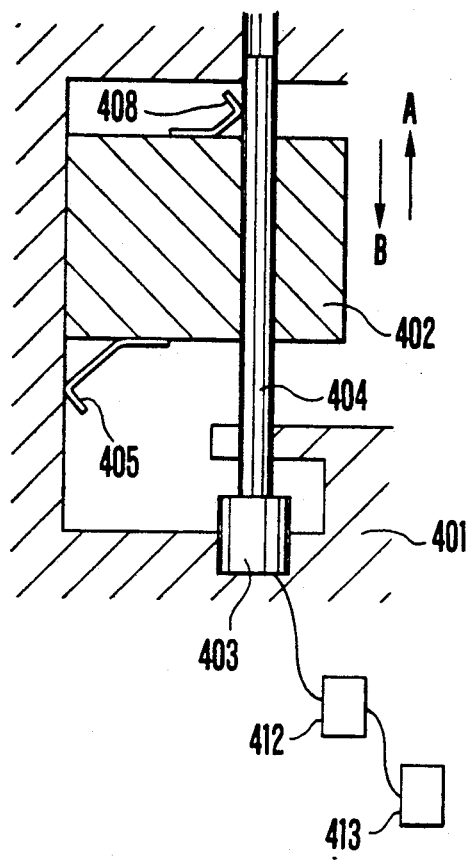
FIG. 17 is a diagrammatic cross-sectional view showing a moving mechanism according to an eighth embodiment of the present invention.
Figure 22:
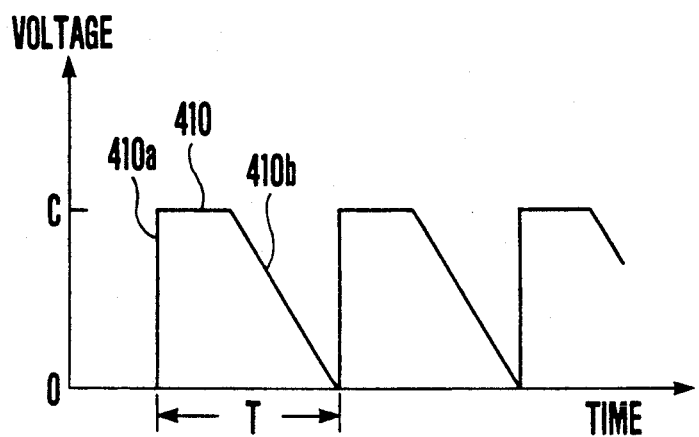
FIGS. 22 and 23 are waveform diagrams.
Figure 23:
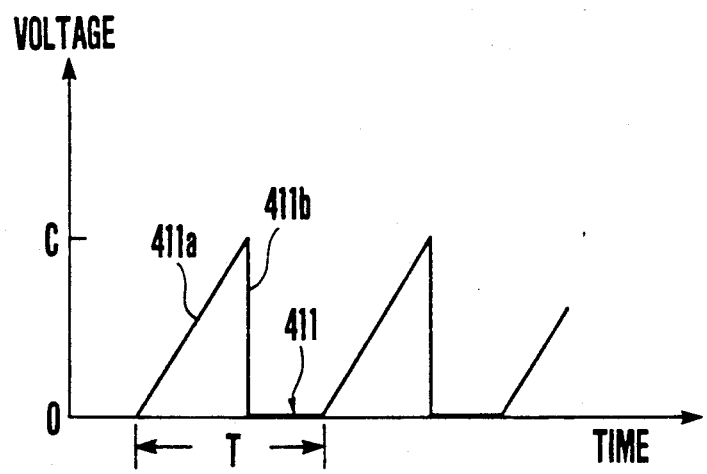

FIG. 17 is a schematic cross-sectional view showing an eighth embodiment, and FIGS. 22 and 23 are diagrams showing different waveforms of a voltage applied to a piezoelectric element.

In FIG. 17, reference numeral 401 denotes a fixed portion consisting of, for example, a frame, reference numeral 404 denotes a vibration shaft which is longitudinally movably supported and guided by the fixed portion 401, and reference numeral 402 denotes a movable object having mass. The movable object 402 is supported and guided by the vibration shaft 404 and the fixed portion 401 with the direction of movement of the movable object 402 restricted by them.

A piezoelectric element 403 is held by the fixed portion 401 in such a manner that the directions of expansion and contraction (lamination direction) of the piezoelectric element 403 coincide with the directions indicated by arrows A and B of FIG. 17. One end face of the piezoelectric element 403 relative to the directions of expansion and contraction of the piezoelectric element 403 abuts against one end of the vibration shaft 404, and the piezoelectric element 403 and the vibration shaft 404 are integrally bonded by an adhesive.

A first leaf spring 405 is secured to the movable object 402 to urge the fixed portion 401 by a constant force, thereby producing a frictional force between the fixed portion 401 and the movable object 402. A second leaf spring 408 is secured to the movable object 402 to urge the vibration shaft 404 by a constant force, thereby producing a frictional force between the movable object 402 and the vibration shaft 404. To prevent the movable object 402 from moving down by its own weight, the sum of the frictional forces produced by the leaf springs 405 and 408 are set to be greater than gravitational force acting on the movable object 402. Also, the frictional force produced by the second leaf spring 408 is set to be greater than that produced by the first leaf spring 405. If the first leaf spring 405 is omitted, the movable object 402 can be made to move, and if the frictional force produced by the second leaf spring 408 is made greater than the gravitational force applied to the movable object 402, it is also possible to prevent the movable object 402 from moving down by its own weight. In this arrangement, however, the frictional force by the second leaf spring 408 becomes excessively large with respect to the mass of the movable object 402, thus lowering the speed of movement of the movable object 402. Accordingly, in this embodiment, both the leaf springs 405 and 408 are used to impart frictional force to the movable object 402.

Referring to FIGS. 22 and 23, reference numerals 410 and 411 denote different voltage waveforms which are applied for driving of a piezoelectric element. The voltage waveform 410 shown in FIG. 22 has a rapid voltage rise 410a and a relatively slow voltage drop 410b, and the voltage waveform 411 of FIG. 23 has a relatively slow voltage rise 411a and a rapid voltage drop 411b.

Referring back to FIG. 17, a voltage waveform adjusting circuit 412 serves as a voltage controlling circuit, and is connected to a power source 413 and the piezoelectric element 403 by electric wires, respectively.

The operation of the moving mechanism having the above-described arrangement will be described below.

For example, if the voltage waveform shown in FIG. 22 is applied to the piezoelectric element 403, the piezoelectric element 403 rapidly expands in the direction of the arrow A at the rapid voltage rise 410a and the vibration shaft 404 is also made to move in the direction of the arrow A by an amount equivalent to the expansion of the piezoelectric element 403. During this time, the movable object 402 hardly moves since it does not follow the movement of the vibration shaft 404 by the inertia of the movable object 402 due to the own weight thereof and by the frictional force produced by the first leaf spring 405. Then, at the relatively slow voltage drop 410b, the piezoelectric element 403 slowly contracts in accordance with the voltage drop. During this time, the vibration shaft 404 is made to move slowly in the direction of the arrow B, and the movable object 402 is also made to move in the direction of the arrow B because the frictional force produced by the second leaf spring 408 is greater than that produced by the first leaf spring 405. The above-described sequence of operations is repeated and the movable object 402 is made to move in the direction of the arrow B.

If the voltage waveform shown in FIG. 23 is applied to the piezoelectric element 403, the piezoelectric element 403 slowly expands at the relatively slow voltage rise 411a in the direction of the arrow A as viewed in FIG. 17 in accordance with the voltage rise, and the vibration shaft 404 is also made to move in the direction of the arrow A. During this time, the movable object 402 moves together with the vibration shaft 404 in the direction of the arrow A owing to the frictional force produced by the second leaf spring 408. Then, the piezoelectric element 404 rapidly contracts at the rapid voltage drop 411b and the vibration shaft 404 is made to move rapidly in the direction of the arrow B by an amount equivalent to the contraction of the piezoelectric element 403. During this time, the movable object 402 hardly moves since it does not follow the movement of the vibration shaft 404 by the inertia of the movable object 402 due to the own weight thereof and by the frictional force produced by the first leaf spring 405. In other words, the movable object 402 is made to move in the direction of the arrow A by the application of the voltage waveform shown in FIG. 23.

Figure 18:
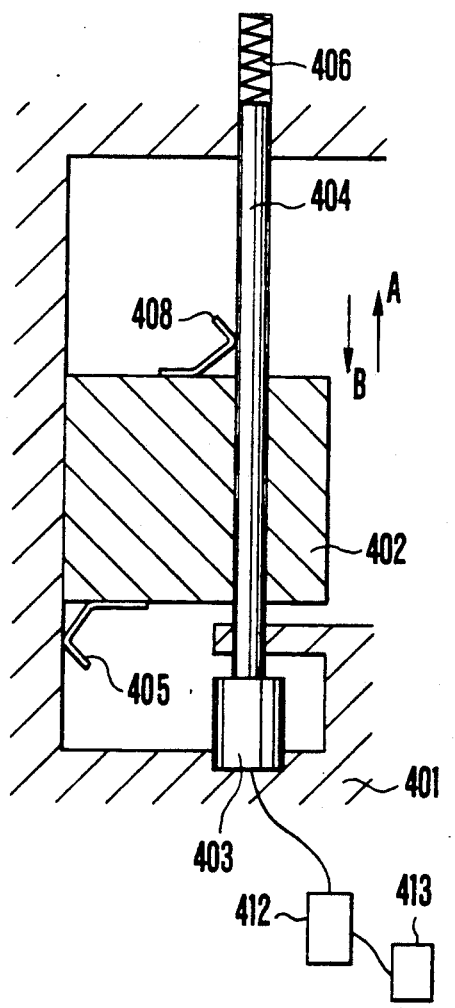
FIG. 18 is a diagrammatic cross-sectional view showing a moving mechanism according to a ninth embodiment of the present invention.

In the aforesaid embodiment, the piezoelectric element 403 and the vibration shaft 404 are fixed to each other by the adhesive so that the movement of the vibration shaft 404 follows the expansion and contraction of the piezoelectric element 403. As shown in FIG. 18, a coil spring 406 is provided on a side opposite to the piezoelectric element 403, and the vibration shaft 404 and the piezoelectric element 403 are maintained in contact with each other. The vibration shaft 404 is at all times pressed in contact with the piezoelectric element 403 by the spring force of the coil spring 406 so that the vibration shaft 404 is prevented from moving away from the piezoelectric element 403 by the expansion or contract of the piezoelectric element 403.

The rotation of the movable object 402 about the vibration shaft 404 is restricted by the fixed portion 401. However, a similar effect can be obtained by fitting the movable object 401 onto a guide shaft 407 as shown in FIG. 19.

Figure 19:
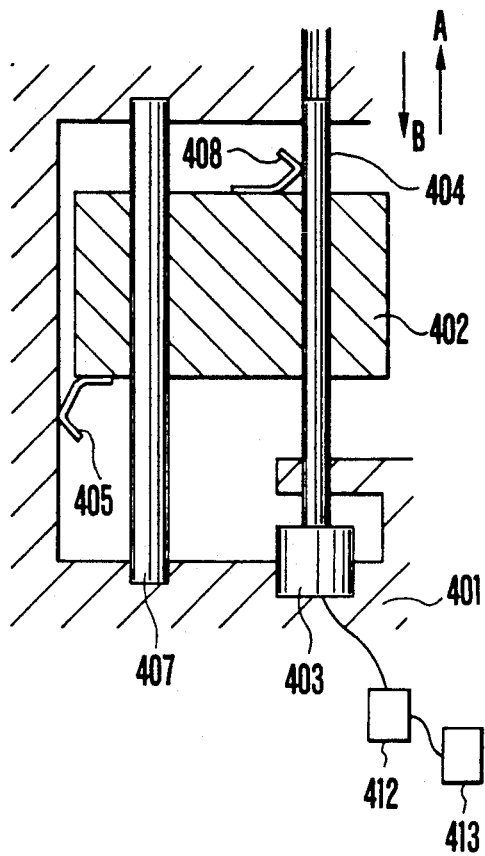
FIG. 19 is a diagrammatic cross-sectional view showing a moving mechanism according to a tenth embodiment of the present invention.
Figure 20:
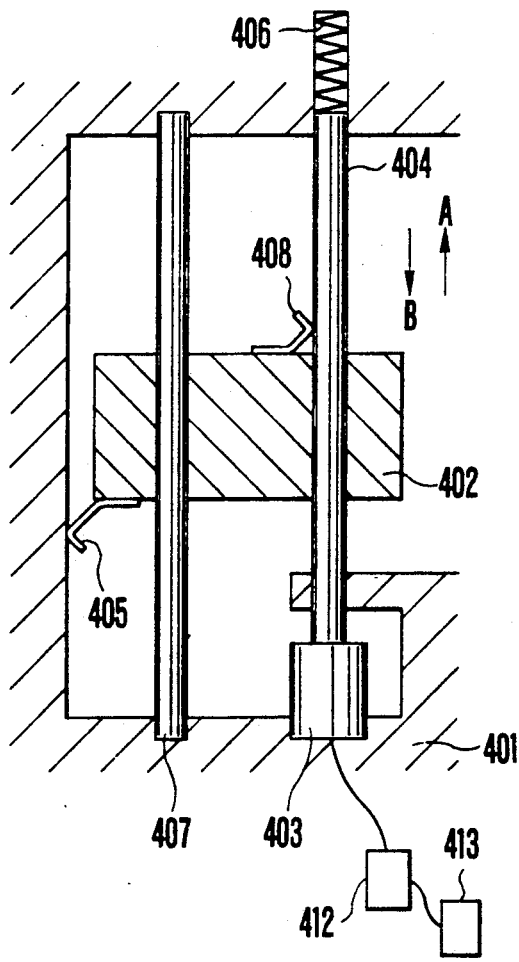
FIG. 20 is a diagrammatic cross-sectional view showing a moving mechanism according to an eleventh embodiment of the present invention.

FIG. 20 shows an embodiment consisting of a combination of the embodiments shown in FIGS. 18 and 19.

Figure 21:
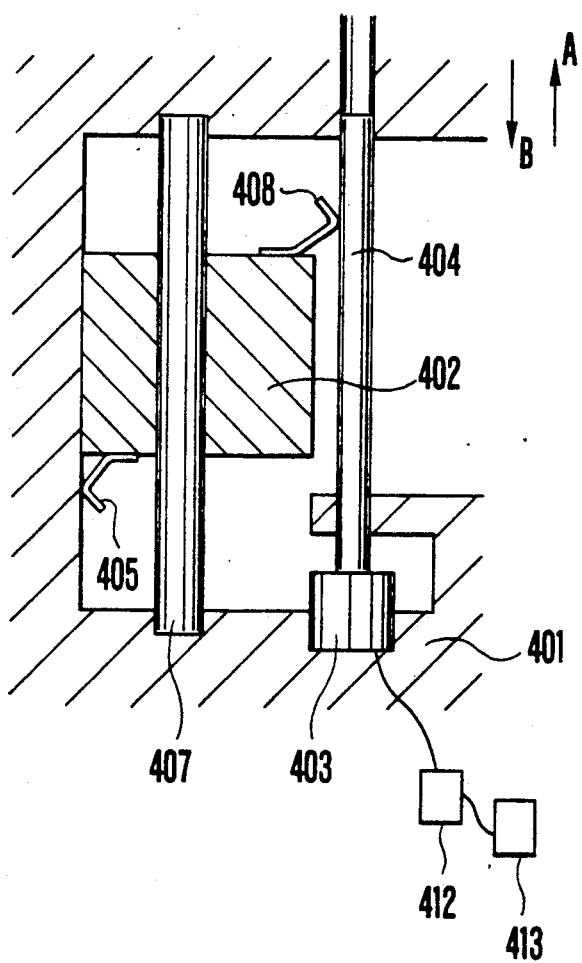
FIG. 21 is a diagrammatic cross-sectional view showing a moving mechanism according to a twelfth embodiment of the present invention.

The movable object 402 is supported by the vibration shaft 404 which is inserted through the movable object 402. To obtain a similar effect, the movable object 402 may also be supported and guided by the guide shaft 407 and the fixed portion 401 as shown in FIG. 21.

Figure 24:
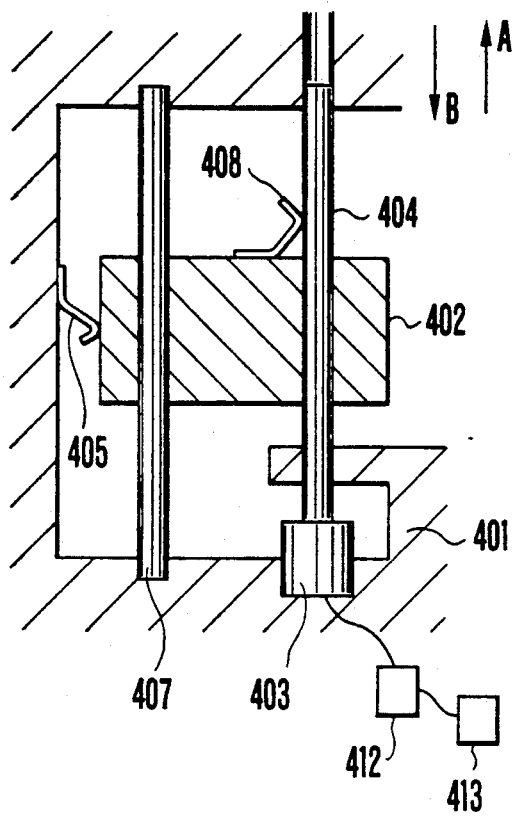
FIGS. 24 and 25 are diagrammatic cross-sectional views showing modifications of the respective embodiments of FIGS. 19 and 17.
Figure 25:
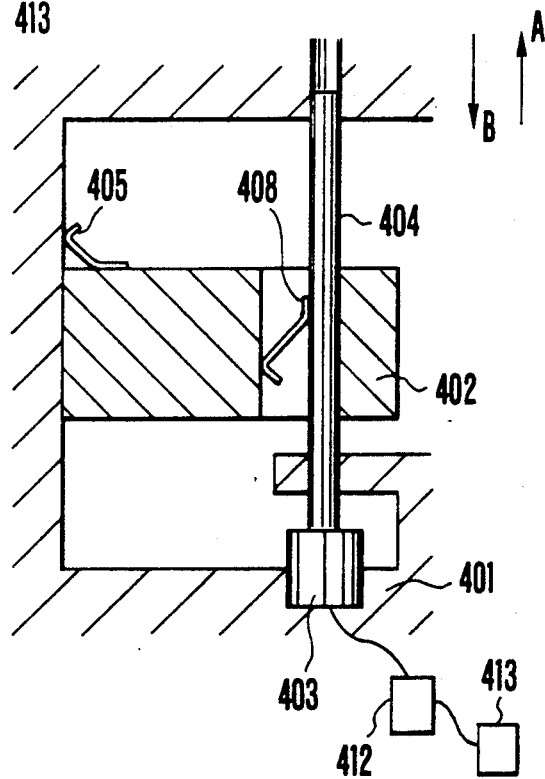

The first leaf spring 405 may be provided on the fixed portion 401 as shown in FIG. 24 and the second leaf spring 408 on the vibration shaft 404 as shown in FIG. 25. In this arrangement as well, a similar effect can be obtained.

Although a leaf spring is used as friction means for producing frictional forces for the movable object, an elastic member such as a coil spring or a rubber may also be employed.

As is apparent from the foregoing description, in accordance with each of the eighth to twelfth embodiments, an electrical-mechanical energy converting element, for example a piezoelectric element, can be utilized to constitute a moving mechanism having an extremely simple structure, whereby it is possible to provide a miniaturized moving mechanism. In addition, it is possible to achieve, by the application of a voltage, a large amount of movement with respect to an extremely small amount of displacement of the piezoelectric element.

Further, since the amount of displacement of the piezoelectric element is extremely small at the application of a voltage, it is possible to position the movable object with extremely high accuracy.

Further, since the sum of the frictional forces produced by the leaf springs 405 and 408 is greater than gravitational force applied to the movable object, the movable object does not move down by its own weight even if the direction of the movement thereof is set to any direction.

As is apparent from the foregoing description, the moving mechanism according to each of the eighth to twelfth embodiments makes it possible to realize a desired amount of displacement and to effectively miniaturize the device.

Figure 26:
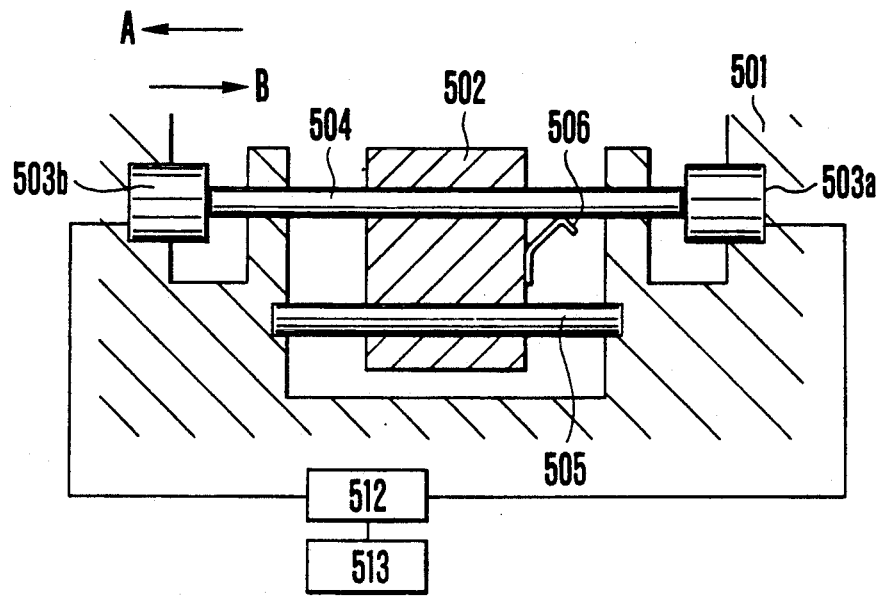
FIG. 26 is a diagrammatic cross-sectional view showing a moving mechanism according to a thirteenth embodiment of the present invention.

FIG. 26 is a diagrammatic view showing a moving mechanism according to a thirteenth embodiment of the present invention.

In FIG. 26, reference numeral 501 denotes a fixed portion, reference numeral 502 denotes a movable object, and reference numerals 503a and 503b denote piezoelectric elements. The piezoelectric elements 503a and 503b are held against the fixed portion 501 in such a manner that the direction of their expansion and contraction (their lamination directions) coincide with the directions indicated by the arrows A and B of FIG. 26. Both ends of a vibration shaft 504 are maintained in contact with the respective piezoelectric elements 503a and 503b, or they are opposed to the respective piezoelectric elements 503a and 503b with small gaps interposed therebetween. These gaps are selected to be smaller than the amounts of expansion of the respective piezoelectric elements 503a and 503b by the application of a voltage. The vibration shaft 504 is held by the fixed portion 501 for movement in the direction of each of the arrows A and B of FIG. 26.

A guide shaft 505 is secured to the fixed portion 501, and serves to guide the axial movement of the movable object 502 while limiting the rotation of the movable object 502 about the vibration shaft 504.

A leaf spring 506 is secured to the movable object 502, and urges the vibration shaft 504 with a constant spring force to produce a frictional force between the movable object 502 and the vibration shaft 504.

Figure 30:
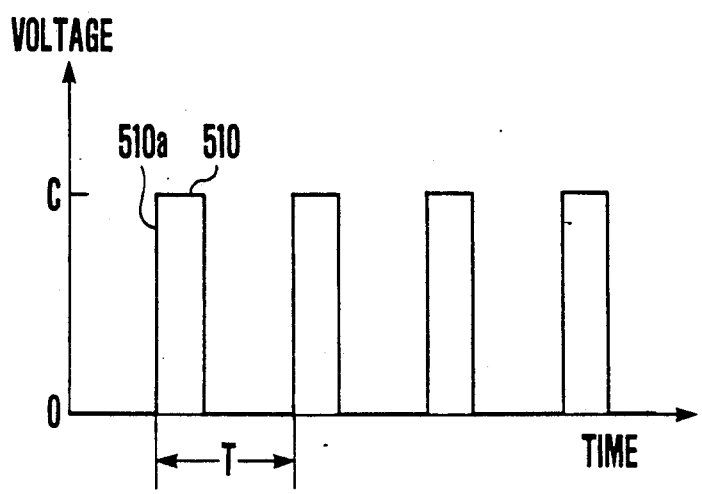
FIGS. 30 and 31 are waveform diagrams showing different waveforms of applied voltage.
Figure 31:
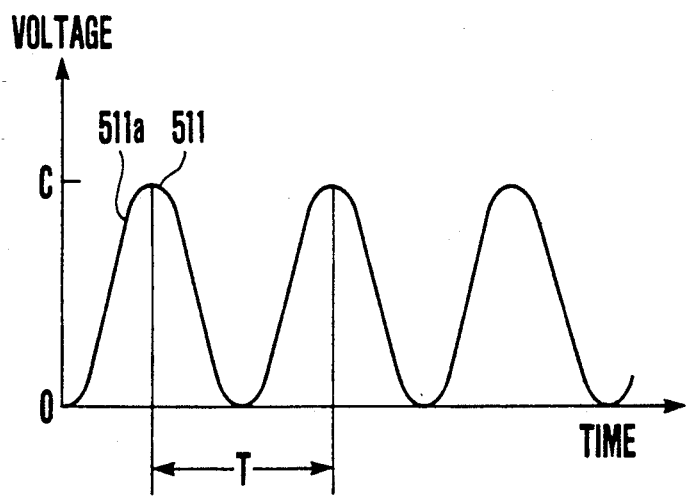

A voltage waveform adjusting circuit 512 is arranged to convert a voltage from a power source 513 into a waveform 510 or 511 having a rapid voltage rise 510a or 511a as shown in FIG. 30 or 31 and apply such a waveform to the piezoelectric elements 503a and 503b. There is also provided a selecting circuit for selectively and alternately applying the waveforms 510 and 511 to the piezoelectric elements 503a and 503b.

In the moving mechanism having the above-described arrangement, if, for example, the waveform 510 shown in FIG. 30 is applied to the piezoelectric element 503a by the voltage waveform adjusting circuit 512, the piezoelectric element 503a rapidly expands in the direction of the arrow A as viewed in FIG. 26 to instantaneously impart a large acceleration (impact) to the vibration shaft 504 in the direction of the arrow A. At this time, the movable object 502 hardly moves since it does not follow the movement of the vibration shaft 504 owing to the inertia of the movable object 502 due to the own weight thereof. Then, as the voltage applied to the piezoelectric element 503a drops, the piezoelectric element 503a contracts and the vibration shaft 504 is made to return to its original position by a reaction to the impact imparted by the piezoelectric element 503a. During this time, the movable object 502 moves together with the vibration shaft 504 by a frictional force which is produced between the vibration shaft 504 and the movable object 502 by the leaf spring 506. In other words, the movable object 502 is made to move in the direction of the arrow B by a small amount. Subsequently, the movable object 502 is made to progressively move in the direction of the arrow B by repeating the above-described operation (cycle T).

If the voltage of the above-described waveform is applied to the piezoelectric element 503b, the movable object 502 is made to move in the opposite direction indicated by the arrow A.

In the above-described embodiment, the impact which has been imparted to the vibration shaft 504 by one piezoelectric element is applied to the other piezoelectric element. To avoid this problem, as shown in FIG. 27, stepped portions may be formed at the opposite end portions of the vibration shaft 504 and engaged with the fixed portion 501 so as to prevent the impact of the vibration shaft 504 from being applied to the other piezoelectric element.

Figure 28:
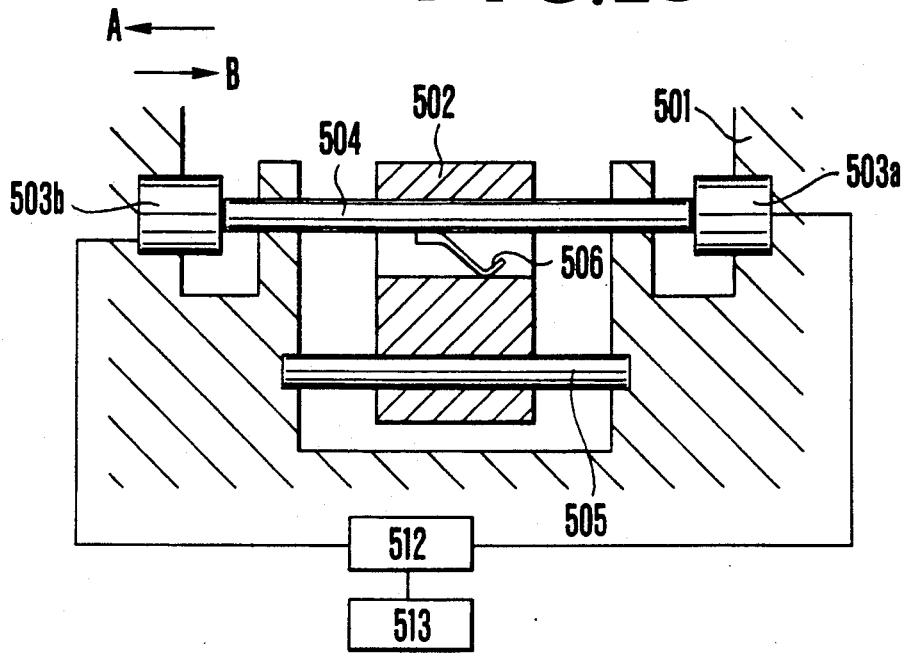

Although the leaf spring 506 is provided on the movable object 502, it may also be provided on the vibration shaft 504 as shown in FIG. 28.

Figure 27:
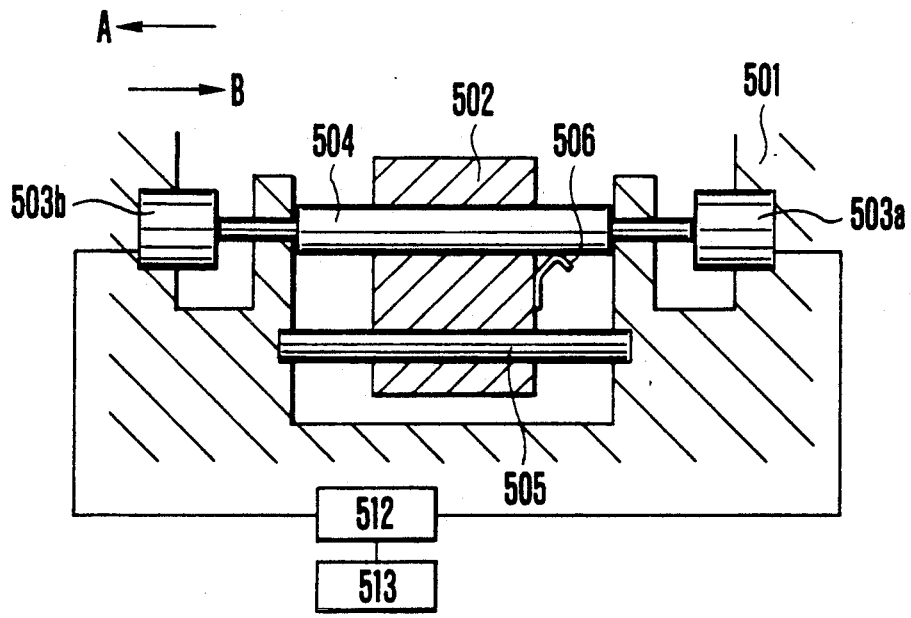
FIGS. 27 to 29 are diagrammatic cross-sectional views respectively showing fourteenth to sixteenth embodiments of the present invention.
Figure 29:
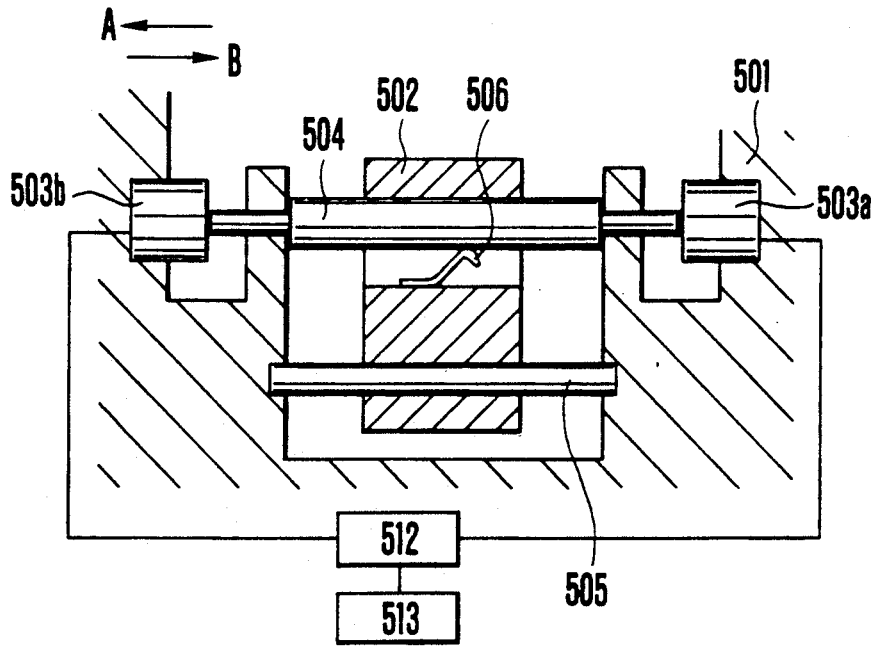

FIG. 29 shows a moving mechanism consisting of a combination of the embodiments shown in FIGS. 27 and 28.

Although in each of the thirteenth to sixteenth embodiments a leaf spring is used as friction means, an elastic member, such as a coil spring or a rubber, or a magnet may also be employed.

As is apparent from the foregoing description, in accordance with each of the thirteenth to sixteenth embodiments of the present invention, a piezoelectric element can be employed to constitute a moving mechanism having an extremely simple structure. Accordingly, it is possible to provide a miniaturized moving mechanism and it is also possible to achieve, by the application of a voltage, a large amount of movement with respect to an extremely small amount of displacement of the piezoelectric element.

Further, since the amount of displacement of the piezoelectric element is extremely small at the application of a voltage, it is possible to position the movable object with extremely high accuracy.

Figure 32:
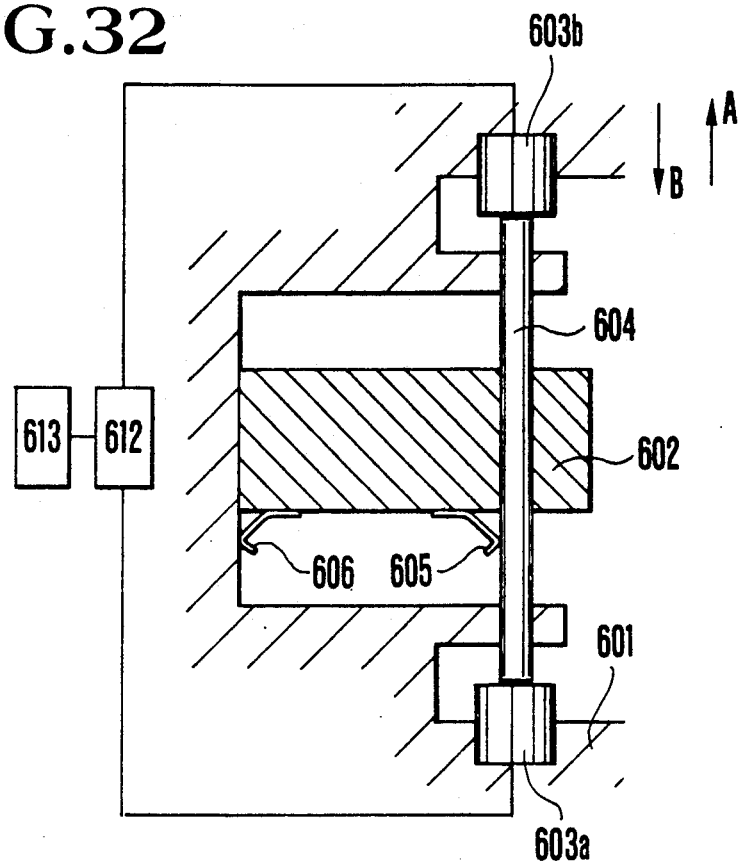
FIG. 32 is a diagrammatic cross-sectional view showing a moving mechanism according to a seventeenth embodiment of the present invention.

FIG. 32 is a diagrammatic view showing a moving mechanism according to a seventeenth embodiment of the present invention.

In FIG. 32, reference numeral 601 denotes a fixed portion, reference numeral 602 denotes a movable object, and reference numerals 603a and 603b denote piezoelectric elements. The piezoelectric elements 603a and 603b are held against the fixed portion 601 in such a manner that the directions of their expansion and contraction (their lamination directions) coincide with the directions indicated by the arrows A and B of FIG. 32. Both ends of a vibration shaft 604 are maintained in contact with the respective piezoelectric elements 603a and 603b, or they are opposed to the respective piezoelectric elements 603a and 603b with small gaps interposed therebetween. These gaps are selected to be smaller than the amounts of expansion of the respective piezoelectric elements 603a and 603b by the application of a voltage. The vibration shaft 604 is held by the fixed portion 601 for movement in the direction of each of the arrows A and B of FIG. 32.

A first leaf spring 605 is secured to the movable object 602, and urges the vibration shaft 604 with a constant spring force to produce a frictional force between the movable object 602 and the vibration shaft 604.

A second leaf spring 606 is secured to the movable object 602, and urges the fixed portion 601 with a constant spring force to produce a frictional force between the movable object 602 and the fixed portion 601. To prevent the movable object 602 from moving down by its own weight, the resultant of the frictional forces produced by the first and second leaf springs 605 and 606 are set to be greater than gravitational force acting on the movable object 602.

If the second leaf spring 606 is omitted, the movable object 602 can be made to move, and if the frictional force produced by the first leaf spring 605 is made greater than the gravitational force applied to the movable object 602, it is also possible to prevent the movable object 602 from moving down by its own weight. In this arrangement, however, the frictional force by the first leaf spring 605 becomes excessively large with respect to the mass of the movable object 602, thus lowering the speed of movement of the movable object 602. Accordingly, in this embodiment, the first and second leaf springs 605 and 606 are used to impart frictional force to the movable object 602.

Figure 37:
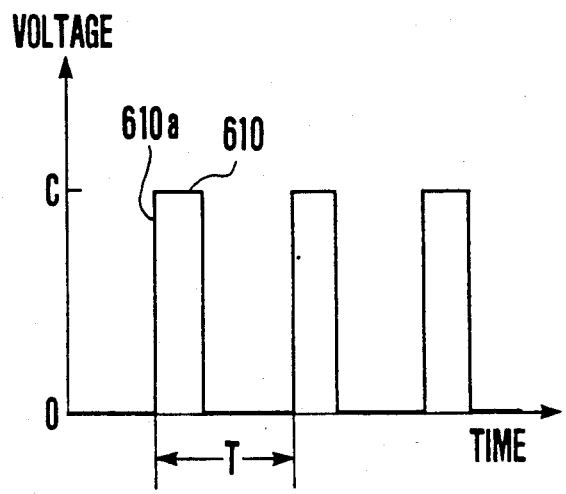
FIGS. 37 and 38 are waveform diagrams showing different waveforms of applied voltage.
Figure 38:
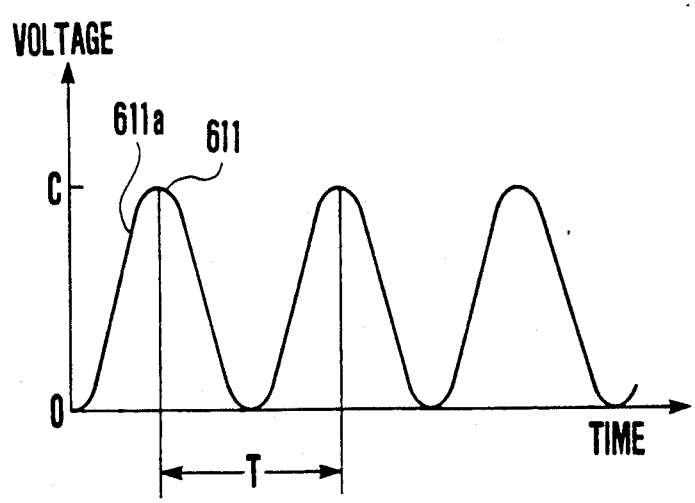

A voltage waveform adjusting circuit 612 is arranged to convert a voltage from a power source 613 into a waveform 610 or 611 having a rapid voltage rise 610a or 611a as shown in FIG. 37 or 38 and apply such a waveform to the piezoelectric elements 603a and 603b. There is also provided a selecting circuit for selectively and alternately applying the waveforms 610 and 611 to the piezoelectric elements 603a and 603b.

In the moving mechanism having the above-described arrangement, if, for example, the waveform 610 shown in FIG. 37 is applied to the piezoelectric element 603a by the voltage waveform adjusting circuit 612, the piezoelectric element 603a rapidly expands in the direction of the arrow A as viewed in FIG. 32 to instantaneously impart a large acceleration (impact) to the vibration shaft 604 in the direction of the arrow A.

At this time, the movable object 602 hardly moves since it does not follow the movement of the vibration shaft 604 owing to the inertia of the movable object 602 due to the own weight thereof. Then, as the voltage applied to the piezoelectric element 603a drops, the piezoelectric element 603a contracts and the vibration shaft 604 is made to return to its original position by a reaction to the impact imparted by the piezoelectric element 603b. During this time, the movable object 602 moves together with the vibration shaft 604 since a frictional force which is produced between the vibration shaft 604 and the movable object 602 by the first leaf spring 605 is greater than a frictional force produced by the second leaf spring 606. In other words, the movable object 602 is made to move in the direction of the arrow B by a small amount. Subsequently, the movable object 602 is made to progressively move in the direction of the arrow B by repeating the above-described operation (cycle T).

If the voltage of the above-described waveform is applied to the piezoelectric element 603b, the movable object 602 is made to move in the opposite direction indicated by the arrow A.

Figure 33:
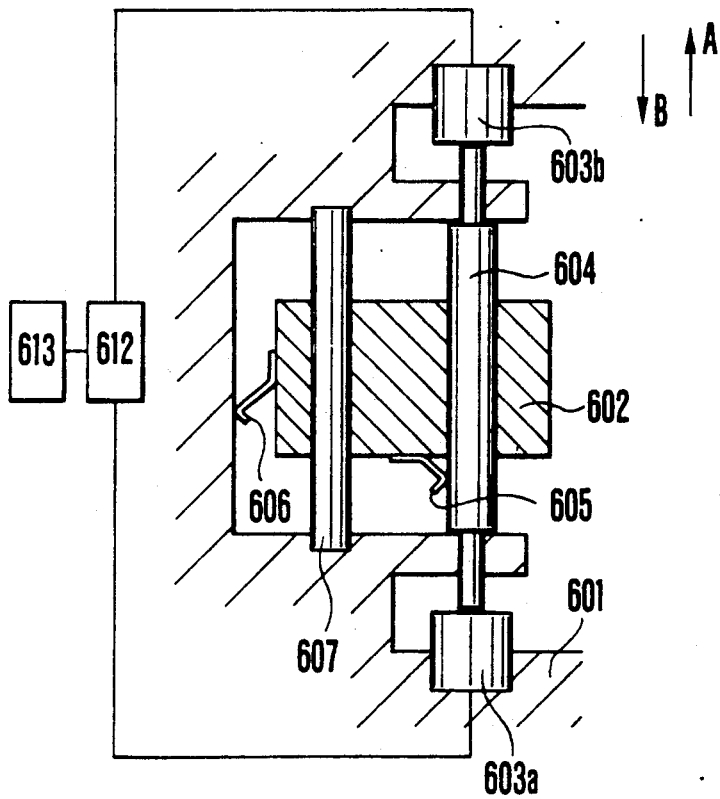
FIGS. 33 to 36 are diagrammatic cross-sectional views respectively showing eighteenth to twenty-first embodiments of the present invention.

In the above-described embodiment, the impact which has been imparted to the vibration shaft 604 by one piezoelectric element is applied to the other piezoelectric element. To avoid this problem, as shown in FIG. 33, stepped portions may be formed at the opposite end portions of the vibration shaft 604 and engaged with the fixed portion 601 so as to prevent the impact of the vibration shaft 604 from being applied to the other piezoelectric element.

Figure 34:
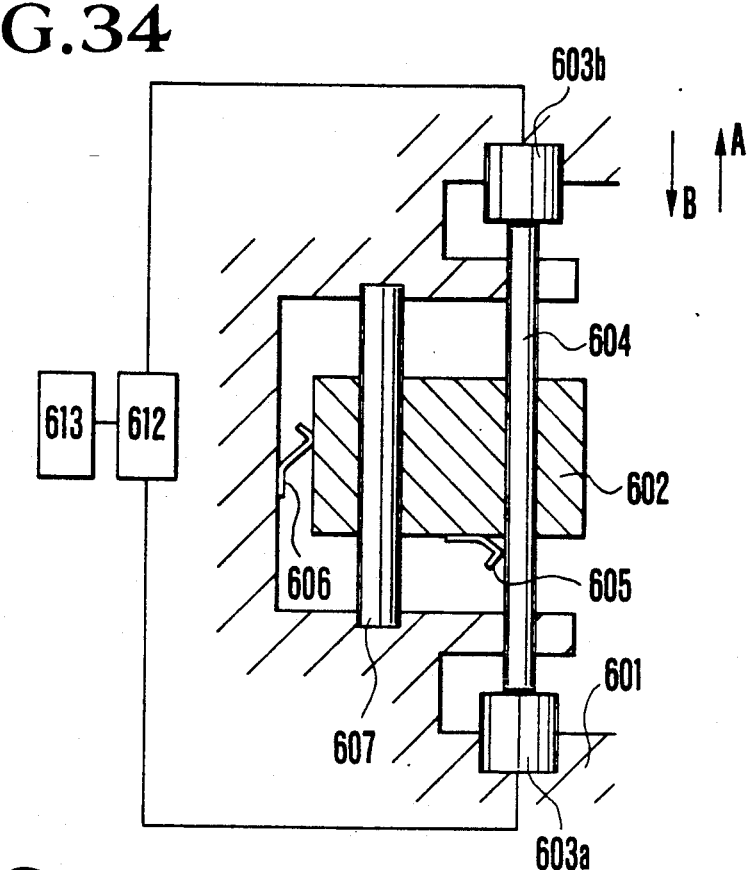

Although the second leaf spring 606 is provided on the moving object 602, it may also be provided on the fixed portion 601 as shown in FIG. 34 or on both the moving object 602 and the fixed portion 601.

Figure 35:
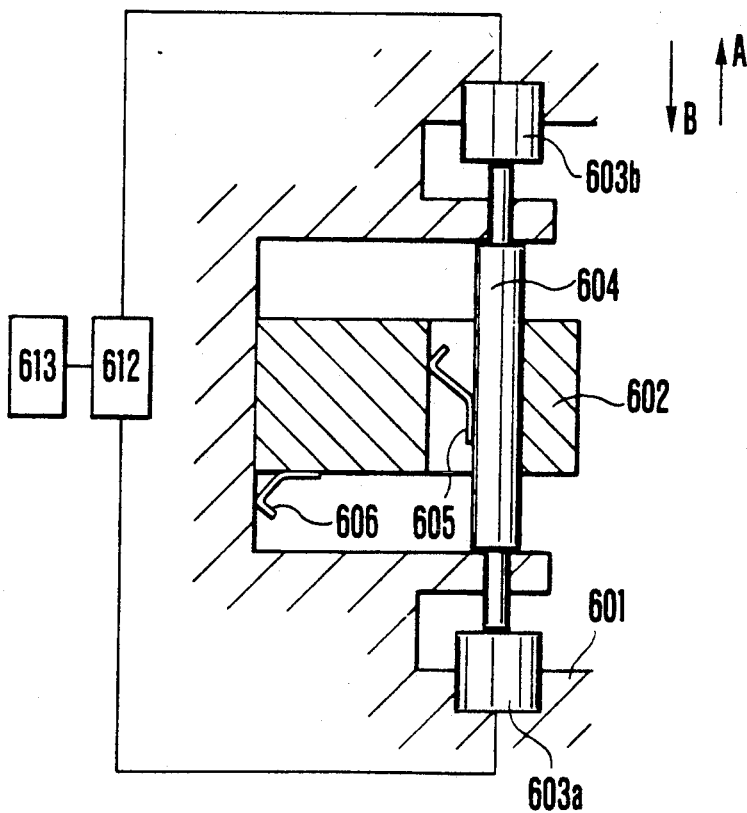

Although in the embodiment shown in FIG. 32 the first leaf spring 605 is provided on the moving object 602, it may also be provided on the vibration shaft 604 as shown in FIG. 35 or on both the moving object 602 and the vibration shaft 604.

Figure 36:
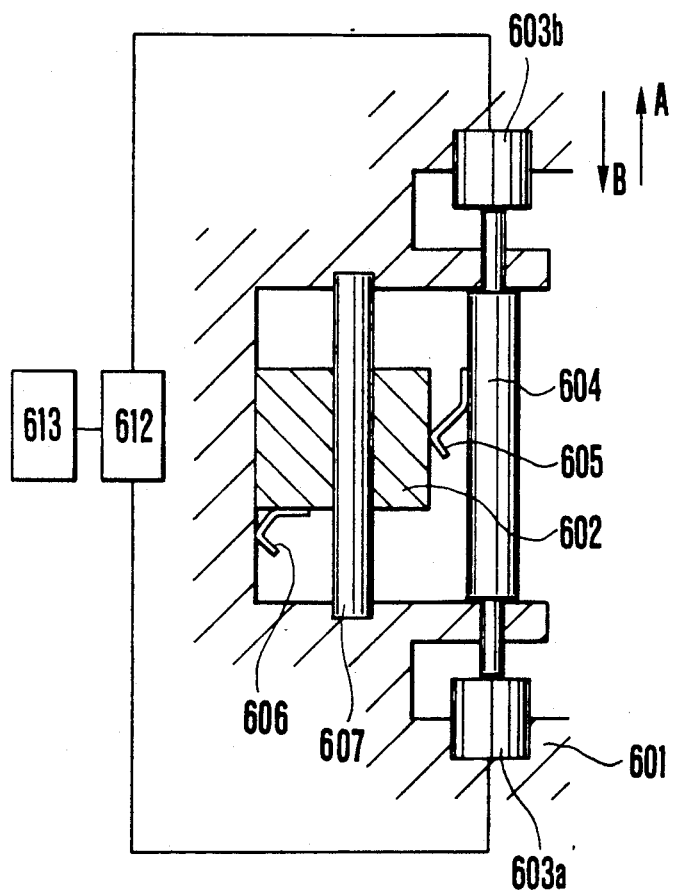

Alternatively, as shown in FIG. 36, the movable object 602 may be fitted onto a guide shaft 607 alone and a frictional force may be produced between the movable object 602 and the vibration shaft 604 by the first leaf spring 605 provided on the vibration shaft 604.

Although in each of the seventeenth to twenty-first embodiments a leaf spring is used as friction means, an elastic member, such as a coil spring or a rubber, or a magnet may also be employed.

As is apparent from the foregoing description, in accordance with each of the seventeenth to twenty-first embodiments of the present invention, a piezoelectric element can be employed to constitute a moving mechanism having an extremely simple structure. Accordingly, it is possible to provide a miniaturized moving mechanism and it is also possible to achieve, by the application of a voltage, a large amount of movement with respect to an extremely small amount of displacement of the piezoelectric element.

Further, since the amount of displacement of the piezoelectric element is extremely small at the application of a voltage, it is possible to position the movable object with extremely high accuracy.

Furthermore, since the resultant of the frictional forces produced by first and second friction means consisting of leaf springs or the like is selected to be greater than gravitational force applied to the movable object, it is possible to prevent the movable object from moving down by its own weight even if the direction of movement of the movable object is set to any direction.

What is claimed is:

1. A driving device comprising:
   a driving member frictionally engaged with a driven member or a member coupled to said driven member;
   a fixed member movably supporting said driving member;
   a piezoelectric element disposed in contact with said driving member; and
   driving means for applying a voltage to said piezoelectric element so as to make a speed of expansion of said piezoelectric element different from a speed of contraction thereof.

2. A device according to claim 1, further comprising an elastic member having a springy portion in a flat area extending in directions of expansion and contraction of said piezoelectric element and being disposed on said driven member or said member coupled to said driven member, said elastic member being brought into contact with said driving member to impart a frictional engaging force to said driving member.

3. A device according to claim 1, further comprising position detecting means for detecting a position of said driven member which is in movement, said driving means controlling expansion and contraction of said piezoelectric element on the basis of detection information provided by said position detecting means.

4. A device according to claim 3, wherein said driven member causes an optical element to move along an optical axis thereof.

5. A device according to claim 1, wherein said driven member is movably supported by a bar member, said bar member being used as said driving member.

6. A device according to claim 5, wherein one end of said piezoelectric element is secured to said bar member and the other end is secured to said fixed member which supports said bar member.

7. A device according to claim 1, wherein said driven member moves a head for writing or reading information.

8. A driving device comprising:
   a driven member frictionally engaged with a fixed member;
   a guide bar movably supporting said driven member;
   a piezoelectric element secured at one end to said driven member and at the other end to a weight; and
   driving means for applying a voltage to said piezoelectric element so as to make a speed of expansion of said piezoelectric element different from a speed of contraction thereof.

9. A device according to claim 8, wherein said driven member is a lens-holding structure.

10. A device according to claim 9, further comprising a plurality of guide bars for movably supporting said driven member.

11. A device according to claim 10, wherein said piezoelectric element is disposed in the vicinity of one of said guide bars.

12. A device according to claim 8, further comprising position detecting means for detecting a position of said driven member which is in movement, said driving means controlling expansion and contraction of said piezoelectric element on the basis of detection information provided by said position detecting means.

13. A device according to claim 11, further comprising an elastic member frictionally engaging said fixed member and said driven member with each other.

14. A device according to claim 8, wherein said driven member moves a head for writing or reading information.

15. A device according to claim 8, further comprising an elastic member having a springy portion in a flat area extending in directions of expansion and contraction of said piezoelectric element, said elastic member being brought into contact with said driven member to impart a frictional engaging force thereto.

16. An apparatus having a driving mechanism, comprising:
   first and second guide members;
   first and second piezoelectric elements secured at one ends to said first and second guide members, respectively, and at the other ends to individual fixed members;
   first and second driven members supported for movement relative to said first and second guide members, said first driven member being in first frictional engagement with said first guide member and in non-frictional engagement with said second guide member or in frictional engagement with said second guide member which frictional engagement is weaker than said first frictional engagement, said second driven member being in second frictional engagement with said second guide member and in non-frictional engagement with said first guide member or in frictional engagement with said first guide member which frictional engagement is weaker than said second frictional engagement; and
   driving means for causing said first and second piezoelectric elements to operate independently, said driving means causing said first and second piezoelectric elements to operate so a to make speeds of expansion and contraction of said first piezoelectric element different from speeds of expansion and contraction of said second piezoelectric element.

17. An apparatus according to claim 16, wherein said first and second guide members are bar-shaped.

18. An apparatus according to claim 17, wherein said first and second driven members are lens-holding members. respectively supported by said first and second bar-shaped guide members.

19. An apparatus according to claim 16, further comprising:
   first position detecting means for detecting a position of said first driven member which is in movement; and
   second position detecting means for detecting a position of said second driven member which is in movement, wherein
   said driving means controls expansion and contraction of said first and second piezoelectric elements on the basis of detection information provided by said first and second position detecting means.

20. A driving device comprising:
   a piezoelectric element having expansion and contraction directions;
   a fixed object in contact with a first end of said piezoelectric element relative to the directions of expansion and contraction;

a vibration shaft in contact with a second end of said piezoelectric element relative to the direction of expansion and contraction;

a movable object supported for movement in the direction of expansion and contraction of said piezoelectric element;

first friction means for producing a first frictional force between said fixed object and said movable object;

second friction means for producing a second frictional force between said movable object and said vibration shaft, with the second frictional force being greater than the first frictional force produced by said first friction means; and controlling means for controlling the expansion and contraction of said piezoelectric element.

21. A device according to claim 20, further comprising elastic means for urging said vibrating shaft in a direction in which said vibration shaft is brought into contact with said piezoelectric element.

22. A device according to claim 20, further comprising means for preventing rotation of said movable object.

23. A driving device comprising:
a fixed object;
a vibration shaft supported for movement relative to said fixed object in an axial direction thereof;
first and second piezoelectric elements disposed on opposite ends of said vibration shaft, each of said first and second piezoelectric elements being arranged to expand and contract in directions of expansion and contraction substantially parallel to an axial direction of said vibration shaft and to cause said vibration shaft to move in the axial direction by the expansion and contraction of each of said first and second piezoelectric elements;
a movable object supported for movement in the directions of expansion and contraction of said first and second piezoelectric elements;
friction means for producing a frictional force between said vibration shaft and said movable object; and
controlling means for controlling the expansion and contraction of each of said first and second piezoelectric elements.

24. A device according to claim 23, further comprising means for preventing rotation of said movable object.

25. A driving device comprising:
a fixed object;
a vibration shaft supported for movement relative to said fixed object in an axial direction thereof;
first and second piezoelectric elements disposed on opposite ends of said vibration shaft, each of said first and second piezoelectric elements being arranged to expand and contract in directions of expansion and contraction substantially parallel to an axial direction of said vibration shaft and to cause said vibration shaft to move in the axial direction by the expansion and contraction of each of said first and second piezoelectric elements;
a movable object supported for movement in the direction of expansion and contraction of said first and second piezoelectric elements;
first friction means for producing a frictional force between said vibration shaft and said movable object;
second friction means for producing a second frictional force smaller than said first frictional force between said movable object and said fixed object, a resultant of said first and second frictional forces being greater than gravitational force applied to said movable object; and
controlling means for controlling the expansion and contraction of each of said first and second piezoelectric elements.

26. A device according to claim 25 further comprising means for preventing rotation of said movable object.

* * * * *

UNITED STATES PATENT AND TRADEMARK OFFICE
CERTIFICATE OF CORRECTION

PATENT NO. : 5,225,941
DATED : July 6, 1993
INVENTOR(S) : Saito, et al

It is certified that error appears in the above-indentified patent and that said Letters Patent is hereby corrected as shown below:

COLUMN 1:

Line 63, "1a" should read --10a--.

COLUMN 11:

Line 31, "extent" should read --extend--.
Line 61, "friction" should read --friction between--.

COLUMN 28:

Line 3, "claim 11," should read --claim 8,--.
Line 49, "bers." should read --bers--.

UNITED STATES PATENT AND TRADEMARK OFFICE
CERTIFICATE OF CORRECTION

PATENT NO. : 5,225,941
DATED : July 6, 1993
INVENTOR(S) : Saito, et al

It is certified that error appears in the above-indentified patent and that said Letters Patent is hereby corrected as shown below:

COLUMN 29:

Line 19, "vibrating" should read --vibration--.

COLUMN 30:

Line 38, "claim 25" should read --claim 25,--.

Signed and Sealed this

Twelfth Day of April, 1994

Attest:

Attesting Officer

BRUCE LEHMAN

Commissioner of Patents and Trademarks